US009712727B2

United States Patent
Yamasaki

(10) Patent No.: US 9,712,727 B2
(45) Date of Patent: Jul. 18, 2017

(54) NAIL INFORMATION DETECTION DEVICE, DRAWING APPARATUS, AND NAIL INFORMATION DETECTION METHOD

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/854,691

(22) Filed: Sep. 15, 2015

(65) Prior Publication Data

US 2016/0088197 A1    Mar. 24, 2016

(30) Foreign Application Priority Data

Sep. 22, 2014   (JP) .................................. 2014-192125

(51) Int. Cl.
| | | |
|---|---|---|
| *H04N 5/225* | (2006.01) | |
| *H04N 5/232* | (2006.01) | |
| *G06T 7/55* | (2017.01) | |
| *A45D 29/00* | (2006.01) | |

(52) U.S. Cl.
CPC ............. *H04N 5/225* (2013.01); *A45D 29/00* (2013.01); *G06T 7/55* (2017.01); *H04N 5/23229* (2013.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 5,175,601 A | * | 12/1992 | Fitts ................... | G01B 11/2513 250/237 G |
| 5,931,166 A | * | 8/1999 | Weber .................... | A45D 34/04 132/200 |
| 6,067,996 A | * | 5/2000 | Weber .................... | A45D 34/04 132/200 |
| 6,286,517 B1 | * | 9/2001 | Weber .................... | A45D 29/00 132/200 |
| 7,123,983 B2 | * | 10/2006 | Yogo ...................... | A45D 31/00 700/161 |

(Continued)

FOREIGN PATENT DOCUMENTS

JP       2003534083 A      11/2003

*Primary Examiner* — Ted Barnes
(74) *Attorney, Agent, or Firm* — Holtz, Holtz & Volek PC

(57) ABSTRACT

A nail information detection device includes: a placement surface on which a finger having a nail is placed; an imaging unit which images the nail from one direction and acquires a image data; a moving unit which moves the imaging unit while keeping a distance between a measurement plane which is in contact with a peak position of the nail and parallel to the placement surface and the imaging unit constant; and a control unit configured to detect nail information including a first edge position and a second edge position on a shape of the nail.

The control unit aligns a reference point of an imaging range of the imaging unit at the peak position and detects a position on the measurement plane of the nail edge based on the image data as the first edge position; and aligns the reference point at the first edge position and detects a position on the measurement plane of the nail edge based on the image data as the second edge position.

18 Claims, 15 Drawing Sheets

(56) References Cited

U.S. PATENT DOCUMENTS

| | | | | |
|---|---|---|---|---|
| 8,814,291 B2* | 8/2014 | Bitoh | ............... | A45D 29/00 |
| | | | | 347/101 |
| 9,156,282 B2* | 10/2015 | Yamasaki | ............. | B41J 3/4073 |
| 2012/0274683 A1* | 11/2012 | Yamasaki | ............. | B41J 3/4073 |
| | | | | 347/2 |
| 2014/0267517 A1* | 9/2014 | Yamasaki | ............. | B41J 3/4073 |
| | | | | 347/101 |
| 2015/0201734 A1* | 7/2015 | Yamasaki | ............. | A45D 34/04 |
| | | | | 132/200 |

* cited by examiner

NAIL INFORMATION DETECTION DEVICE, DRAWING APPARATUS, AND NAIL INFORMATION DETECTION METHOD

CROSS-REFERENCE TO RELATED APPLICATIONS

This application corresponds to Japanese Patent Application No. 2014-192125 filed on Sep. 22, 2014.

BACKGROUND OF THE INVENTION

1. Field of the Invention

The present invention relates to a nail information detection device, a drawing apparatus, and a nail information detection method.

2. Description of the Related Art

In related art, painting devices for printing nail designs on fingernails and toenails are known. Such a painting device is disclosed in JP 2003-534083 A, for example. Use of such a painting device allows for easily enjoying nail designs without use of nail salons or the like.

Such a painting device is configured to image a nail with a camera before painting, detect a nail region from an obtained image, and paint an image on the detected nail region.

The painting device as described above is configured to image a nail only in one direction with a single camera. Note that nails have shapes curving in the width direction. It is thus difficult to accurately detect nail information such as the dimension of a nail in the width direction between both edges thereof and the height of the nail from the edges in the width direction to the center thereof with the configuration in which a nail is imaged only from one direction with a single camera.

In contrast, with such a configuration in which two cameras are provided, one of which is used to image a nail from directly above and the other is used to image the nail obliquely, for example, the nail information can be detected relatively accurately.

For the configuration in which two cameras are provided and a nail can be imaged from directions different from each other in this manner, however, the device structure will be complex and the manufacturing cost of the device will be increased.

BRIEF SUMMARY OF THE INVENTION

The present invention is advantageous in providing a nail information detection device, a drawing apparatus, and a nail information detection method capable of properly detecting information on the shape of a nail including the dimension of the nail in the width direction with a configuration in which the nail is imaged by an imaging unit only from one direction.

A nail information detection device according to a first aspect of the present invention includes: a placement surface on which a finger or a toe having a nail is placed, the nail having a nail edge at one end in a width direction of the nail; an imaging unit which images the nail from one direction and acquires image data of an image of the nail; a moving unit which moves the imaging unit relative to the nail while keeping an imaging distance in the one direction constant, the imaging distance being a distance between the imaging unit and a measurement plane, the measurement plane being in contact with a peak position of the nail in the width direction and being parallel to the planar direction of the placement surface; and a control unit which controls the moving unit and the imaging unit to detect nail information including a first edge position and a second edge position on a shape of the nail, wherein the control unit performs: a first edge detection process in which the moving unit positions the imaging unit to a first position so that a reference point of an imaging range of the imaging unit in the width direction is aligned at the peak position, and the control unit detects a position on the measurement plane of the nail edge as the first edge position based on the image data acquired by the imaging unit being at the first position; and a second edge detection process of performing (1) a first process in which the moving unit positions the imaging unit to a second position so that the reference point is aligned at the first edge position, and the control unit detects a position on the measurement plane of the nail edge as the second edge position based on the image data acquired by the imaging unit being at the second position or (2) a second process in which the moving unit positions the imaging unit to a second position so that the reference point is aligned at a position of the nail edge based on the image data acquired by the imaging unit, and the control unit detects the second position as the second edge position.

A drawing apparatus according to a second aspect of the present invention includes: a placement surface on which a finger or a toe having a nail is placed, the nail having a nail edge at one end in a width direction of the nail; an imaging unit which image the nail from one direction and acquires image data of an image of the nail; a moving unit which moves the imaging unit relative to the nail while keeping an imaging distance in the one direction constant, the imaging distance being a distance between the imaging unit and a measurement plane, the measurement plane being in contact with a peak position of the nail in the width direction and being parallel to the planar direction of the placement surface; a control unit which controls the moving unit and the imaging unit to detect nail information including a first edge position and a second edge position on a shape of the nail, and generate drawing data obtained by correcting data of a set design image based on the nail information; and a drawing unit which draws the nail according to the drawing data, wherein the control unit performs: a first edge detection process in which the moving unit positions the imaging unit to a first position so that a reference point of an imaging range of the imaging unit in the width direction is aligned at the peak position, and the control unit detects a position on the measurement plane of the nail edge as the first edge position based on the image data acquired by the imaging unit being at the first position; and a second edge detection process of performing (1) a first process in which the moving unit positions the imaging unit to a second position so that the reference point is aligned at the first edge position, and the control unit detects a position on the measurement plane of the nail edge as the second edge position based on the image data acquired by the imaging unit being at the second position or (2) a second process in which the moving unit positions the imaging unit to a second position so that the reference point is aligned at a position of the nail edge based on the image data acquired by the imaging unit, and the control unit detects the second position as the second edge position.

A nail information detection method according to a third aspect of the present invention includes: an imaging step of imaging a nail of a finger or a toe placed on a placement surface, the nail having a nail edge at one end in a width direction of the nail, by an imaging unit from one direction and acquiring image data of an image of the nail; a moving step of moving the imaging unit relative to the nail while keeping an imaging distance in the one direction constant, the imaging distance being a distance between the imaging unit and a measurement plane, the measurement plane being in contact with a peak position of the nail in the width direction and being parallel to the planar direction of the placement surface; and a nail information detecting step of controlling the imaging unit to detect nail information including a first edge position and a second edge position on a shape of the nail, wherein the nail information detecting step includes: a first edge detecting step of positioning the imaging unit to a first position so that a reference point of an imaging range of the imaging unit in the width direction is aligned at the peak position, and detecting a position on the measurement plane of the nail edge as the first edge position based on the image data acquired by the imaging unit being at the first position; and a second edge detecting step of performing (1) a first processing step of positioning the imaging unit to a second position so that the reference point is aligned at the first edge position, and detecting a position on the measurement plane of the nail edge as the second edge position based on the image data acquired by the imaging unit being at the second position or (2) a second processing step of positioning the imaging unit to a second position so that the reference point is aligned at a position of the nail edge based on the image data acquired by the imaging, and detecting the second position as the second edge position.

DETAILED DESCRIPTION OF THE INVENTION

Figure 1:
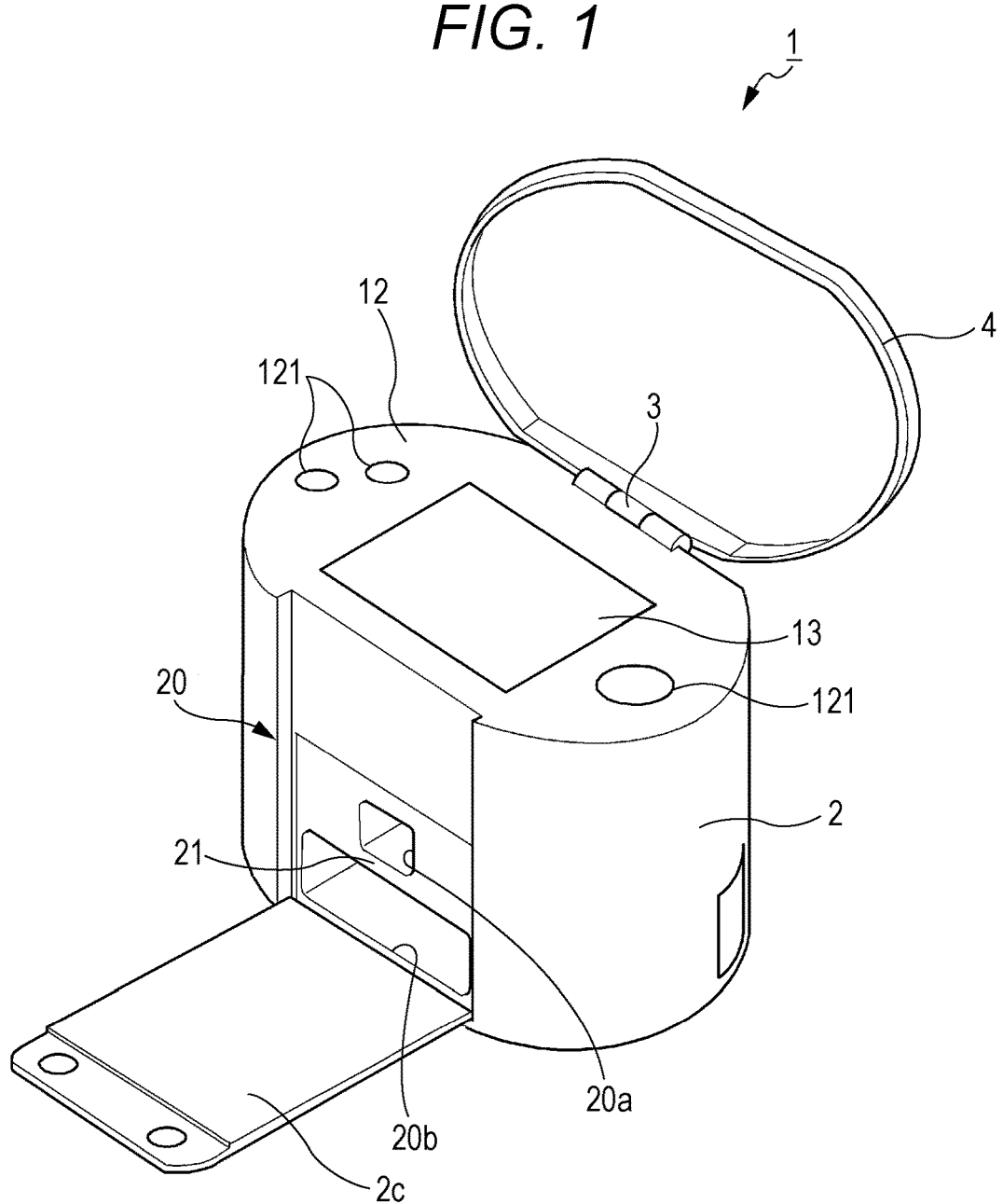
FIG. 1 is a perspective view illustrating an external appearance of a nail printing device according to an embodiment.

An embodiment of a drawing apparatus to which a nail information detection device according to the present invention is applied will be described in detail below with reference to the drawings.

Although the embodiment described below is limited in various technically preferable manners, the scope of the present invention is not limited to the embodiment below and examples illustrated in the drawings.

In the embodiment below, description will be given on a nail printing device that paints a fingernail of a hand that is a target to be painted. Surfaces to be painted in the present invention, however, are not limited to fingernails. Toenails, for example, may be targets to be painted.

FIG. 1 is a perspective view illustrating an external appearance of a nail printing device according to the embodiment.

Figure 2:
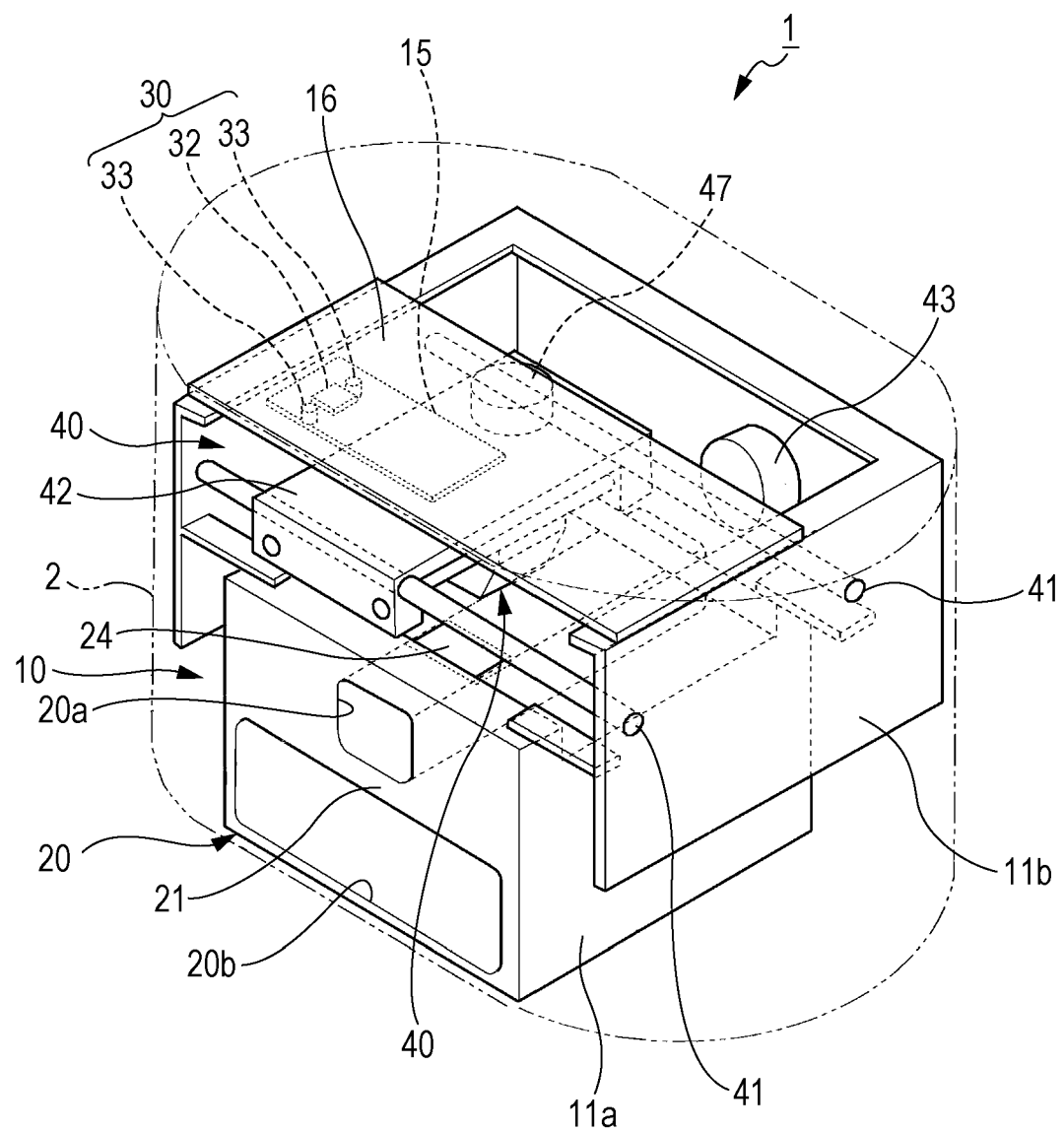
FIG. 2 is a perspective view illustrating an internal configuration of the nail printing device of FIG. 1.

FIG. 2 is a perspective view illustrating an internal configuration of the nail printing device.

As illustrated in FIG. 1, the nail printing device (drawing apparatus) 1 includes a case body 2 and a cover 4.

The cover 4 is connected to the case body 2 with a hinge 3 attached to a rear edge of an upper face (top plate) of the case body 2 in such a manner that the cover 4 can be turned.

The cover 4 can be turned from a state of being placed on the top plate of the case body 2 to a state of being up against the top plate of the case body 2 (see FIG. 1) about the hinge 3 as a fulcrum.

The case body 2 is formed in a substantially oval shape as viewed in plan view from above. The case body 2 is provided, at the front, with an opening and closing plate 2c that can be put up and laid down.

The opening and closing plate 2c is connected to the case body 2 with a hinge (not illustrated) attached to a lower edge of the front face of the case body 2. The opening and closing plate 2c is for opening and closing the front face of the case body 2.

Note that the shapes and structures of the case body 2 and the cover 4 are not limited to those described herein.

An operation unit 12 is provided on the upper face (top plate) of the case body 2.

The operation unit 12 allows the user to provide various inputs.

The operation unit 12 includes a power switch button for powering the nail printing device 1 on, a stop switch button for stopping the operation thereof, a design selection button for selecting a design image to be painted on a nail T, a paint start button for instruction of start of drawing, and a selection button 121 for providing various other inputs, for example.

The case body 2 is provided with a display unit 13 at substantially the center of the upper face (top plate) thereof.

The display unit 13 is constituted by a liquid crystal display (LCD), an organic electroluminescence display, or any other flat display, for example.

In the embodiment, the display unit 13 displays an image obtained by imaging a print target finger U1 (hereinafter referred to as a "finger image"), a nail image (an image of the outline of a nail T or the like) contained in the finger image, a design selection screen for selecting a design image to be painted on the nail T, thumbnail images for checking designs, an announcement screen, and a warning screen, for example, as appropriate.

The display unit 13 may have a touch panel integrally provided on the surface thereof. In this case, various inputs can also be performed with a stylus pen, which is not illustrated, which is a pointed stick like a writing material pressed against the surface of the touch panel for writing or by touching operation of touching the surface of the display unit 13 with a fingertip or the like, for example.

The case body 2 houses a main body 10 of the nail printing device 1.

Figure 3:
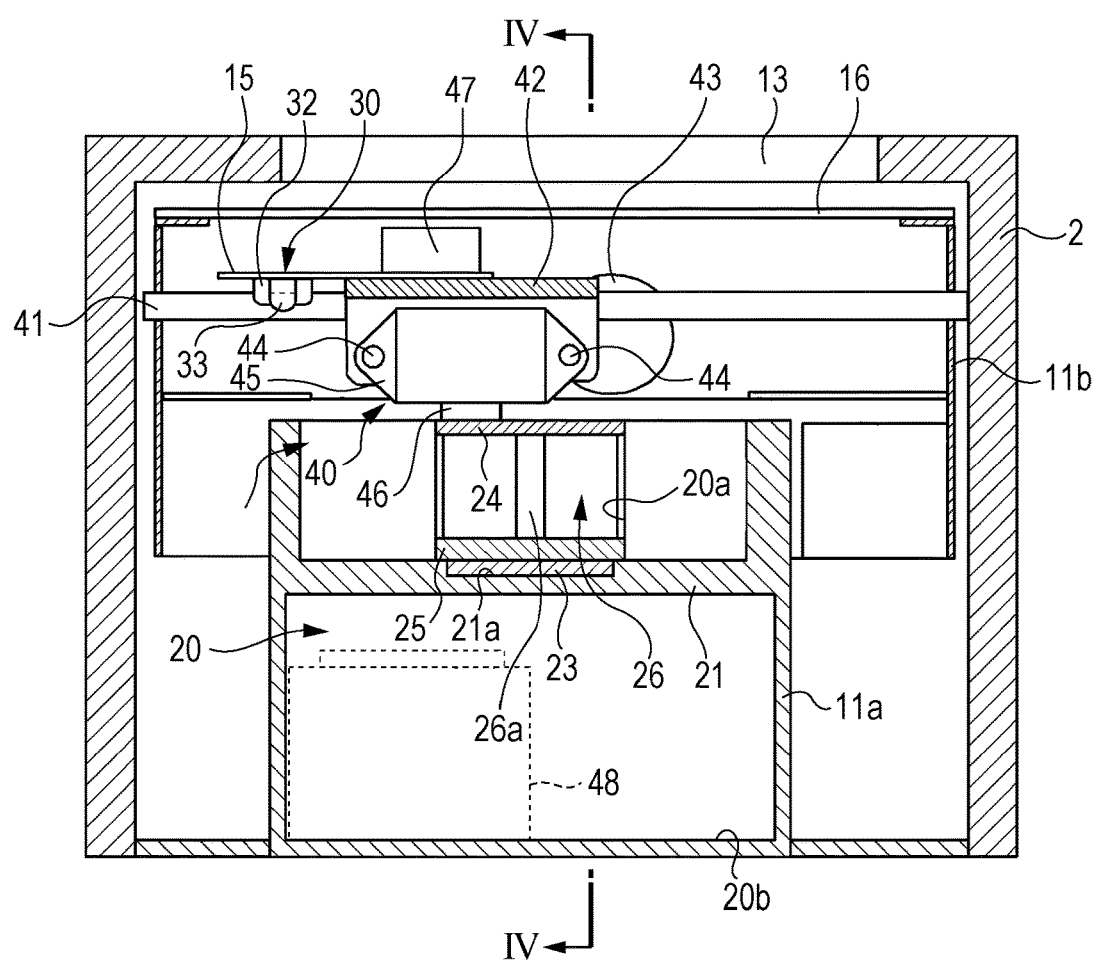
FIG. 3 is a front view of a device main body according to the embodiment.

FIG. 3 is a front view of the device main body according to the embodiment.

Figure 4:
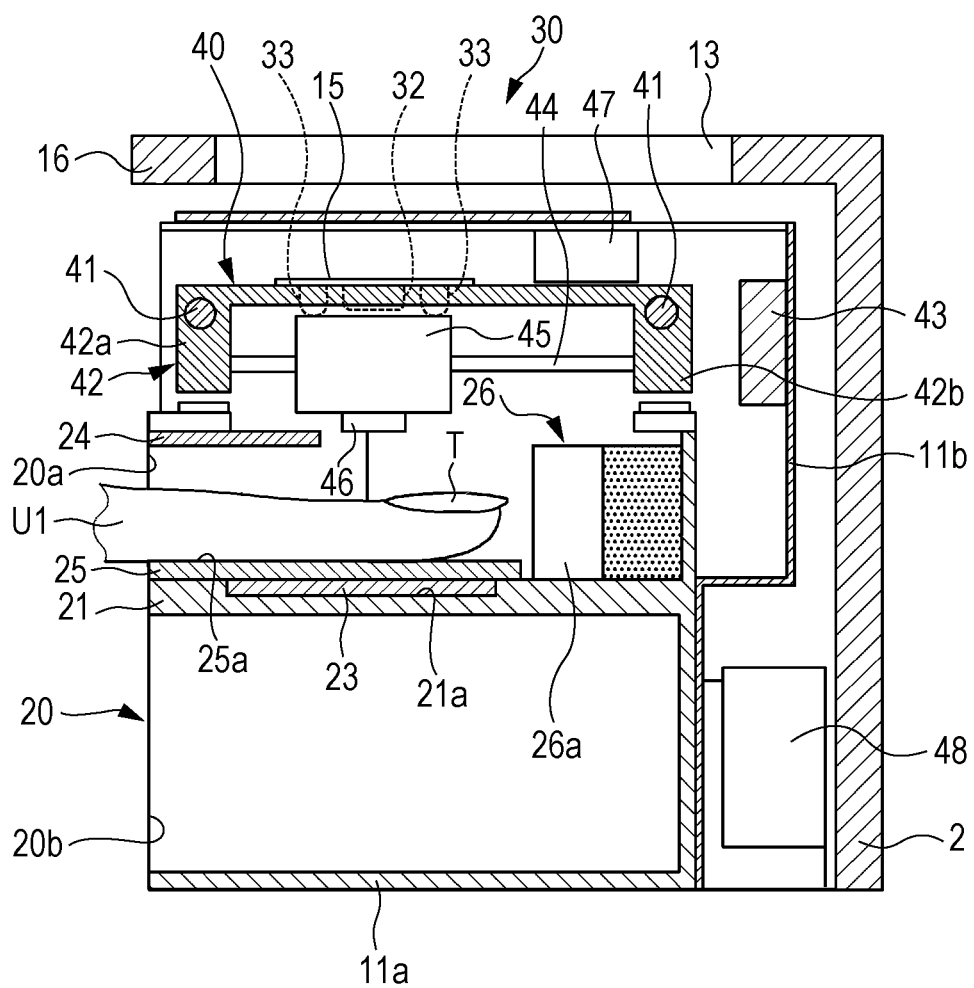
FIG. 4 is a cross-sectional view taken along a IV-IV line illustrated in FIG. 3 as viewed in the direction of arrows.

FIG. 4 is a cross-sectional view taken along a IV-IV line illustrated in FIG. 3 as viewed in the direction of arrows.

As illustrated in FIGS. 2 to 4, the device main body 10 includes a lower casing 11a formed in a substantially box shape and disposed at a lower part inside the case body 2, and an upper casing 11b disposed above the lower casing 11a and at an upper part inside the case body 2.

These lower casing 11a and upper casing 11b are provided with a print target finger fixing part 20, an imaging unit 30, a drawing unit 40, a controller 50 (see FIG. 6), and so forth.

The print target finger fixing part 20 is installed in the lower casing 11a. Specifically, the lower casing 11a has a print-target-finger insertion part 20a and non-print-target-finger insertion part 20b, which constitute the print target finger fixing part 20.

The print-target-finger insertion part 20a and the non-print-target-finger insertion part 20b are separated from each other by a partition 21.

Note that the print-target-finger insertion part 20a is a finger insertion part into which a finger (hereinafter referred to as a "print target finger U1") corresponding to the nail T to be painted is inserted (see FIG. 4).

In the embodiment, a case in which one print target finger U1 at a time is inserted into the print-target-finger insertion part 20a for drawing and the like of the nail T will be described as an example.

The shape, the size, and the like of the print-target-finger insertion part 20a are not particularly limited, but the print-target-finger insertion part 20a is formed in such a size that is not too tight for an adult's thumb or the like being inserted thereinto so that the print-target-finger insertion part 20a can be used for any of the five fingers.

A finger pressing part 24 for restricting the position of a print target finger U1 in the height direction is provided at an upper part inside the print-target-finger insertion part 20a.

The finger pressing part 24 is a plate member. When a print target finger U1 is lifted up, the upper face of the print target finger U1 is pressed against a lower face of the finger pressing part 24. In this manner, the print target finger U1 is positioned in the height direction so as not to be lifted too high (see FIG. 11C, for example).

A finger placement part 25 is disposed inside the print-target-finger insertion part 20a and below the finger pressing part 24.

The finger placement part 25 is a plate member having an upper face serving as a flat placement surface 25a. When a print target finger U1 is inserted into the print-target-finger insertion part 20a, the print target finger U1 is placed on the placement surface 25a.

In the present embodiment, a recess 21a is formed in an upper face of the partition 21 (that is, a bottom face of the print-target-finger insertion part 20a) under the finger placement part 25.

In the recess 21a, a lifting mechanism 23 inserted in the print-target-finger insertion part 20a and capable of pressing the finger placement part 25 (that is, the print target finger U1 placed on the finger placement part 25) up from below is provided.

The lifting mechanism 23 has a structure that expands and swells with an increase in internal hydraulic pressure or air pressure and deflates and contracts with a decrease in the hydraulic pressure or air pressure, for example. The lifting mechanism 23 expands and swells to press the finger placement part 25 (the print target finger U1 placed on the finger placement part 25) up from below, and deflates and contracts to be contained in the recess 21a and becomes substantially flush with the upper face of the partition 21.

The lifting and lowering operation the of lifting mechanism 23 is controlled by a lifting control unit 513 (see FIG. 6) of the controller 50, which will be described later. The lifting mechanism 23 lifts the print target finger U1 inserted in the print-target-finger insertion part 20a and placed on finger placement part 25 until the upper face of the print target finger U1 hits the lower face of the finger pressing part 24.

In the embodiment, in a state in which the upper face of the print target finger U1 that has been pressed up by the lifting mechanism 23 is pressed against the lower face of the finger pressing part 24, the nail T is held at a height set so as to be suitable for drawing with a drawing head 46.

A nail placement part 26 on which at least a tip portion of the nail T of a print target finger U1 inserted in the print-target-finger insertion part 20a is placed is disposed inside the print-target-finger insertion part 20a and behind the finger placement part 25 (on the side farther from the user in the finger inserting direction; on the right in FIG. 4).

The nail placement part 26 is made of rubber, resin, or the like, for example. The material, etc. of the nail placement part 26, however, is not limited to those mentioned herein.

The material, etc. of the nail placement part 26 is preferably a material that is not altered by ink adhesion. Furthermore, the material, etc. of the nail placement part 26 is preferably a material that is flexible to a certain degree so that strain on the fingertip or the like is suppressed when the nail T is placed on the nail placement part 26.

The upper face of the print target finger U1 at the base thereof is pressed against the lower face of the finger pressing part 24 and pressed downward, so that the position of the print target finger U1 in the height direction is fixed. The position of the tip portion including the nail T of the print target finger U1, however, varies in the vertical direction depending on the degree to which the finger is bent or the like. Thus, the position of the nail T in the height direction cannot be fixed by the finger pressing part 24 alone. Specifically, when a downward force is exerted at the tip of the print target finger U1, the nail T is brought into a state of being lowered downward. Conversely, when a force is exerted to warp the tip of the print target finger U1 upward, the nail T is brought into a state of being raised upward.

For highly fine drawing, it is necessary to keep the distance between the drawing head 46 and the upper face of the nail T at a predetermined distance. Drawing cannot be performed favorably if the position of the nail T is too high or too low. Furthermore, if the position of the fingertip is not stable, the nail T may be moved up or down during drawing, which may result in misalignment.

As will be described later, in recognition of the shape of a nail T on the basis of image data of a nail image acquired by a camera 32 (that is, detection of the outline of the nail T), the nail T is recognized as being larger than the actual dimension if the position of the nail T is higher than a predetermined appropriate height or if the distance between the camera 32 and the nail T is shorter than an appropriate distance. If drawing is then performed on the basis of the above, the drawing region will be beyond the nail T and the ink will adhere to the finger.

Conversely, if the position of the nail T is lower than the appropriate height or if the distance between the camera 32 and the nail T is longer than the appropriate distance, the nail T will be recognized as being smaller than the actual dimension. If drawing is then performed on the basis of the above, the drawing region will be smaller than the nail T and the nail T will be partly left unpainted.

In contrast, when at least the tip of the nail T is placed on the nail placement part 26, the position of the nail T can be stabilized and the position of the nail T in the height direction can be fixed.

In the embodiment, as illustrated in FIG. 4, etc., the position of the upper face of the nail placement part 26 and the position of the lower face of the finger pressing part 24 is substantially the same (that is, substantially at the same height).

Note that the height, the size, and the like of the nail placement part 26 are not limited to those illustrated in the drawings. If, however, the position of the upper face of the nail placement part 26 is higher than the position of the lower face of the finger pressing part 24, the fingertip portion that is further ahead of the portion restricted by the finger pressing part 24 needs to be warped upward so that the nail T is placed on the nail placement part 26, which forces the user to keep an uncomfortable posture. It is therefore preferable that the position of the upper face of the nail placement part 26 be set to be not higher than the lower face of the finger pressing part 24.

In the embodiment, a portion of the nail placement part 26 on the side nearer to the user in the finger inserting direction (on the left in FIG. 4) is a narrow portion 26a that is narrower than a typical dimension in the width direction of the nail T. The narrow portion 26a is a portion on which the nail T is placed in the nail placement part 26.

Figure 5A:
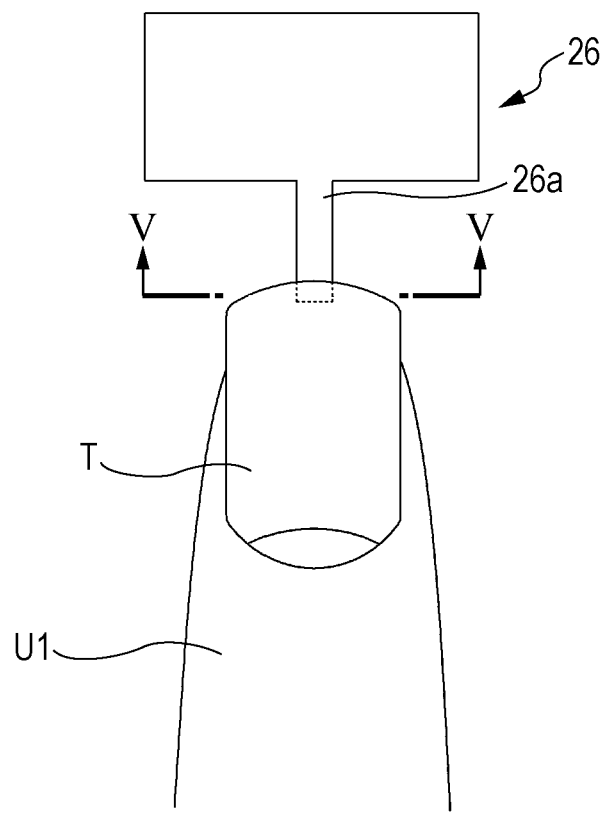
FIG. 5A is a plan view of the tip of a nail T in top view in a state of being placed on a nail placement part as viewed from above.
Figure 5B:
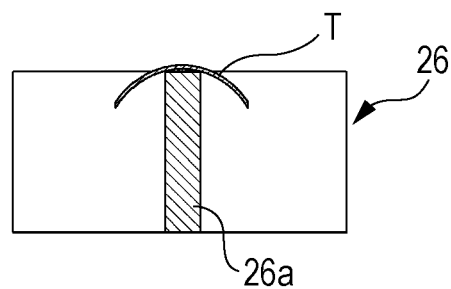
FIG. 5B is a cross-sectional view taken along a V-V line in FIG. 5A as viewed in the direction of arrows.

FIG. 5A is a plan view of the tip of the nail T in top view in a state of being placed on the nail placement part 26 as viewed from above, and FIG. 5B is a cross-sectional view taken along a V-V line in FIG. 5A as viewed in the direction of arrows.

When the portion of the nail placement part 26 on which the nail T is the narrow portion 26a that is narrower than the dimension of the nail T in the width direction, only a substantially central portion of the tip of the nail T in the width direction is placed on the narrow portion 26a of the nail placement part 26 as illustrated in FIG. 5B. As a result, the nail T can be held at a substantially fixed height whether the dimension of the nail in the width direction is large or small.

The non-print-target-finger insertion part 20b is a finger insertion part into which fingers other than a print target finger (not illustrated; hereinafter referred to as "non-print-target fingers") are to be inserted.

In the embodiment, a print target finger U1 is inserted into the print-target-finger insertion part 20a, the non-print-target fingers are inserted into the non-print-target-finger insertion part 20b, and the partition 21 is held between the print target finger U1 and the non-print-target fingers, so that the print target finger U1 is fixed in a stable state.

When a thumb is a print target finger U1, for example, the thumb (print target finger U1) is inserted into the print-target-finger insertion part 20a and four fingers (index finger, middle finger, third finger, and little finger) other than the thumb that are non-print-target fingers are inserted into the non-print-target-finger insertion part 20b. In this case, the user holds the partition 21 between the print target finger U1 and the non-print-target fingers, and as a result, the print target finger U1 is fixed.

Note that an end of the partition 21 on the finger insertion side preferably has such a shape that naturally fits when the bases of the print target finger U1 and the non-print-target fingers are pressed thereagainst, such as circular, oval, or polygonal in cross section, so that the bases of the fingers are not strained when the partition 21 is held tightly between the print target finger U1 and the non-print-target fingers.

The drawing unit 40 is provided mainly in the upper casing 11b.

Specifically, as illustrated in FIGS. 3 and 4, two guide rods 41 arranged horizontally are disposed in parallel between both side plates of the upper casing 11b.

A main carriage 42 is slidably provided on the guide rods 41.

As illustrated in FIG. 4, two guide rods 44 are disposed in parallel between a front wall 42a and a rear wall 42b of the main carriage 42.

A sub carriage 45 is slidably provided on the guide rods 44. The drawing head 46 is mounted on the center of a lower face of the sub carriage 45.

In the embodiment, the drawing head 46 is an inkjet drawing head for drawing by directly spraying ink in fine droplets onto the surface to be painted of a drawing target. Note that the recording method of the drawing head 46 is not limited to the inkjet method.

In the embodiment, the drawing unit 40 is provided with drawing heads 46 for inks of yellow (Y), magenta (M), and cyan (C), for example. The drawing heads 46 each has a nozzle array constituted by multiple nozzles for spraying ink of the corresponding color.

Note that the drawing heads 46 provided in the drawing unit 40 are not limited to those for jetting inks of the three colors. A drawing head 46 for jetting an ink of another color may further be provided.

The drawing heads 46 are used to paint an image (nail design) on the surface of the nail T of a print target finger U1 in a state in which the upper face of the print target finger U1 is pressed against the finger pressing part 24 and at least the tip of the nail T is placed on the nail placement part 26.

The drawing heads 46 are configured to paint the nail T of the print target finger U1 on the basis of nail information detected by a nail information detection unit 512, which will be described later.

Ink cartridges 48 for supplying ink to the drawing heads 46 are provided in the lower casing 11a.

The ink cartridges 48 are connected to the drawing heads 46 via ink supply tubes, which are not illustrated, to supply ink to the drawing head 46 as necessary.

Note that ink cartridges may be mounted on the drawing heads 46.

The main carriage 42 is connected to a motor 43 via a power transmission part (not illustrated), and is configured to move leftward and rightward of the nail printing device 1 (leftward and rightward in FIG. 3) along the guide rods 41 by forward and reverse rotation of the motor 43.

The sub carriage 45 is connected to a motor 47 via a power transmission part (not illustrated), and is configured to move forward and rearward of the nail printing device 1 (leftward and rightward in FIG. 4) along the guide rods 44 by forward and reverse rotation of the motor 47.

The drawing unit 40 includes the guide rods 41, the main carriage 42, the motor 43, the guide rods 44, the sub carriage 45, the drawing heads 46, the motor 47, the ink cartridges 48, and the like.

The motor 43, the drawing heads 46, and the motor 47 of the drawing unit 40 are connected to a drawing control unit 514 of the controller 50, which will be described later, and controlled by the drawing control unit 514.

As illustrated in FIGS. 2 to 4, a substrate 15 having one end extending toward one side of the main carriage 42 is provided on an upper face of the main carriage 42 of the drawing unit 40.

One camera 32 that is the imaging unit 30 is disposed on a lower face of the substrate 15 at the end thereof.

The camera 32 preferably is a camera with about 200 million or more pixels having a built-in driver, for example.

The camera 32 is disposed at a position opposed to the nail T of a print target finger U1 inserted in the print-target-finger insertion part 20a and placed on the placement surface 25a, and is configured to image the nail in the direction perpendicular to the placement surface 25a and to acquire a nail image (a finger image containing a nail image) that is an image of the nail T of the print target finger U1.

A pair of illumination lamps 33 such as white LEDs is installed on the substrate 15 in such a manner that the illumination lamps 33 sandwich the camera 32 between the near side and the far side, for example. The illumination lamps 33 illuminate the nail T of the print target finger U1 during imaging by the camera 32. The imaging unit 30 includes the camera 32 and the illumination lamps 33.

The imaging unit 30 moves in the width direction of the nail T with the movement of the main carriage 42 in the leftward and rightward direction, that is, in the width direction of the nail T.

The main carriage 42 is guided by the pair of guide rods 41 arranged horizontally as described above. Thus, the imaging unit 30 is moved while keeping a constant position in the height direction.

Specifically, the imaging unit 30 is moved relative to the nail T along the width direction of the nail T within a plane parallel to the placement surface 25a, in which the distance in the direction perpendicular to the placement surface 25a between a peak position in the width direction of the nail T at which the height of the nail T from the placement surface 25a is the highest and the imaging unit 30 is set to a predetermined imaging distance.

The main carriage 42, the motor 43, and the pair of guide rods 41 are moving units according to the present invention.

In the embodiment, the nail information detection unit 512, which will be described later, is configured to detect the outline of a nail T (the shape of a nail T) as nail information on the basis of image data of a nail image acquired by one camera 32 that is the imaging unit 30.

The imaging unit 30 is connected to an imaging control unit 511 of the controller 50 (see FIG. 6), which will be described later, and configured to be controlled by the imaging control unit 511.

Image data of images acquired by the imaging unit 30 are stored in a nail image storage area 521 of a storage unit 52, which will be described later.

The controller 50 is installed on a substrate 16 or the like disposed on the upper casing 11b, for example.

Figure 6:
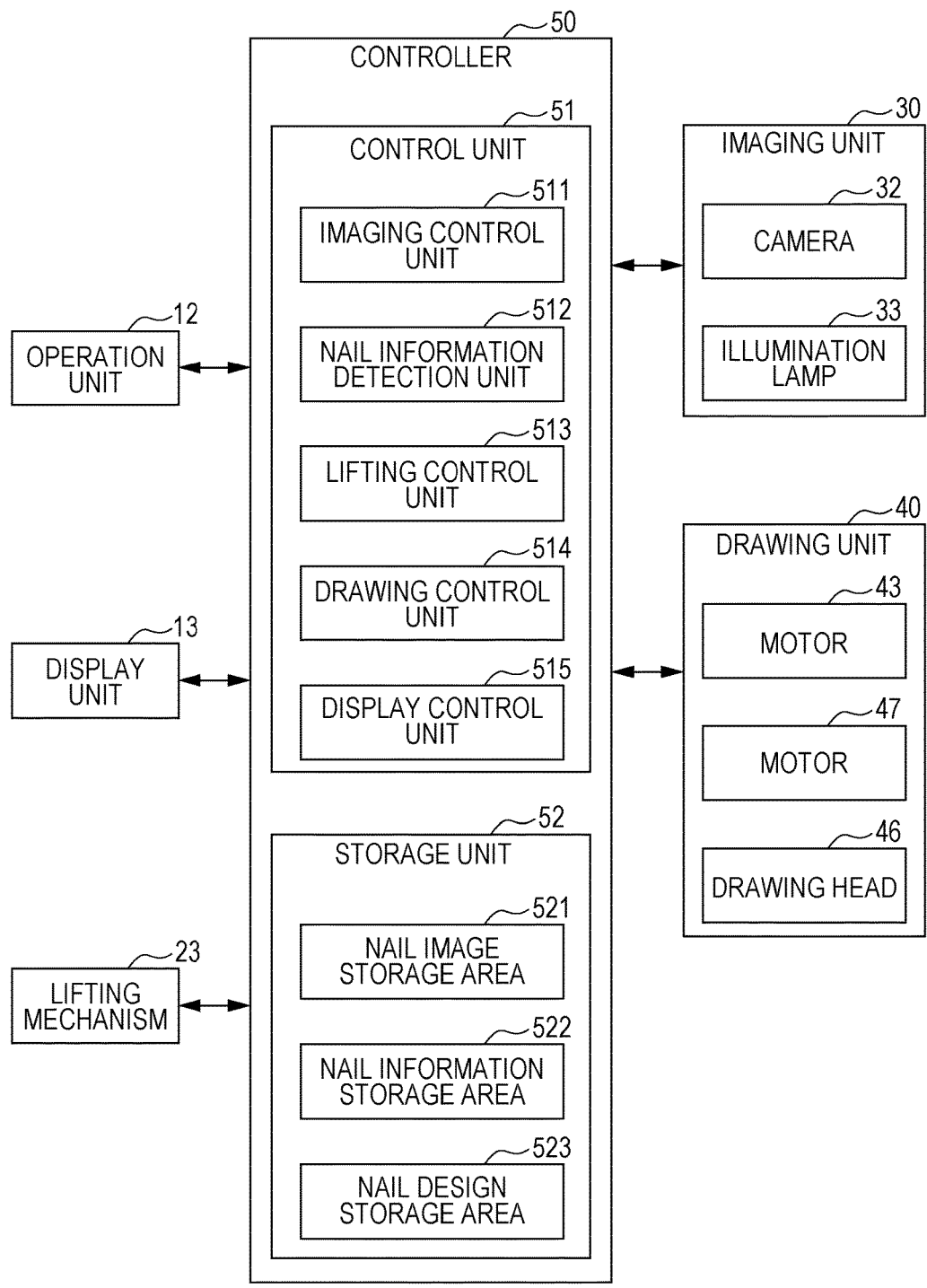
FIG. 6 is a block diagram of a main part illustrating a control configuration according to the embodiment.

FIG. 6 is a block diagram of a main part illustrating a control configuration according to the embodiment.

As illustrated in FIG. 6, the controller 50 is a computer including a control unit 51 constituted by a central processing unit (CPU) or the like, which is not illustrated, and a storage unit 52 constituted by a read only memory (ROM), a random access memory (RAM), and the like.

The storage unit 52 has stored therein various programs and various data, and the like for operating the nail printing device 1.

Specifically, the storage unit 52 has stored therein various programs such as a nail information detection program for detecting nail information of a nail T and a drawing program for performing a drawing process. The controller 50 is configured to execute these programs to control respective components of the nail printing device 1.

In the embodiment, the storage unit 52 is provided with a nail image storage area 521 for storing image data of a nail image of a nail T of a user's print target finger U1 imaged by the imaging unit 30, a nail information storage area 522 for storing nail information (a nail outline in the embodiment) detected by the nail information detection unit 512, and a nail design storage area 523 for storing image data of a nail design to be painted on the nail T.

For the image data of the nail design stored in the nail design storage area 523, rectangle data of a size larger than the size of typical nails T, for example, are provided so as to be applied to nails T of various sizes.

The control unit 51 includes, in terms of functions, functional units such as the imaging control unit 511, the nail information detection unit 512, the lifting control unit 513, the drawing control unit 514, a display control unit 515, and the like.

The functions of the imaging control unit 511, the nail information detection unit 512, the lifting control unit 513, the drawing control unit 514, the display control unit 515, and the like are achieved by cooperation of the CPU of the control unit 51 and the programs stored in the ROM or the like of the storage unit 52. Note that the functional units included in the control unit 51 are not limited to those mentioned herein.

The imaging control unit 511 is configured to control the motor 43 that is a moving unit to move the imaging unit 30 to a predetermined position in the leftward and rightward direction, and in this state, control the imaging unit 30 to image the print target finger U1 of the user to acquire image data of a nail image (a finger image containing a nail image) of the nail T.

The image data of the nail image acquired by the imaging unit 30 are stored in the nail image storage area 521 of the storage unit 52.

Note that the imaging control unit 511 may make the imaging unit 30 image a state of a print target finger U1 inserted into the print-target-finger insertion part 20a while the user inserts the print target finger U1 into the print-target-finger insertion part 20a.

In this case, it is preferable to display an image taken by the imaging unit 30 on the display unit 13 or the like, which allows the user to visually check the position of the print target finger U1 while the user sets the print target finger U1 and appropriately place the tip of the nail T of the print target finger U1 on the nail placement part 26.

The nail information detection unit 512 is configured to detect nail information on the nail T of the print target finger U1 on the basis of the image data of the nail image acquired by one camera 32 that is the imaging unit 30.

In the embodiment, the nail information detection unit 512 detects the outline (nail shape) of the nail T as the nail information.

Specifically, the nail information detection unit 512 detects the outline (shape) and the position of the nail T from the finger image containing the nail image of the nail T of the print target finger U1 acquired by the camera 32, and obtains the outline as information expressed by x, y coordinates or the like.

The method in which the nail information detection unit 512 detects the outline (shape) of the nail T is not particularly limited.

For example, the nail information detection unit 512 detects the outline (shape) of the nail T on the basis of a difference in color between the nail T and the other part of the finger from the finger image containing the nail image of the nail T of the print target finger U1 acquired by the camera 32. Note that the method in which the nail information detection unit 512 detects the outline (shape) of the nail T is not particularly limited, and is not limited to that mentioned herein.

The nail information detection unit 512 also detects the height of the nail T (the height from the position of an edge of the nail T in the width direction to the position at the peak in the width direction), an index (curve level) based on the curvature of the curved shape of the nail T, and the like.

The methods for detecting the height and the curve level of the nail T will be described later. As a result of detecting the height and the curve level by the nail information detection unit 512, drawing can be performed taking the shape of the nail T in the height direction as well, which can achieve drawing with higher accuracy.

The lifting control unit 513 is a functional unit that controls the operation of the lifting mechanism 23 to lift and lower the print target finger U1 inserted in the print-target-finger insertion part 20a.

In the embodiment, the lifting control unit 513 lifts and lowers the print target finger U1 placed on the finger placement part 25, and holds the print target finger U1 at a position where the upper face of the print target finger U1 is in contact with the lower face of the finger pressing part 24 during drawing.

The drawing control unit 514 is configured to output drawing data based on image data of a nail design to the drawing heads 46 of the drawing unit 40, and control the drawing unit 40 so that the nail T is painted by the drawing heads 46 according to the drawing data.

In the embodiment, the control unit 51 adjusts image data of a nail design selected by the user by means of operation of the operation unit 12 or the like to the outline of the nail T detected by the nail information detection unit 512 and also applies curve correction according to the curve level to generate drawing data with a drawing region within the outline of the nail T. The drawing control unit 514 outputs the drawing data to the drawing heads 46.

In the embodiment, as described above, the image data of nail designs stored in the nail design storage area 523 are rectangle data of a large size, and the drawing data are generated by appropriately downsizing the image data of a nail design so as to fit to the outline of the nail T.

The display control unit 515 is configured to control the display unit 13 to display various display screens.

In the embodiment, the display control unit 515 displays an finger image obtained by imaging a print target finger U1, a nail image (an image of the outline of the nail T or the like) contained in the finger image, a design selection screen for selecting an image (that is, a "nail design") to be painted on the nail T, thumbnail images for checking designs, instruction screens for displaying various instructions, and the like, for example, on the display unit 13.

Next, a drawing process performed by the nail printing device 1 according to the embodiment will be described.

Figure 7:
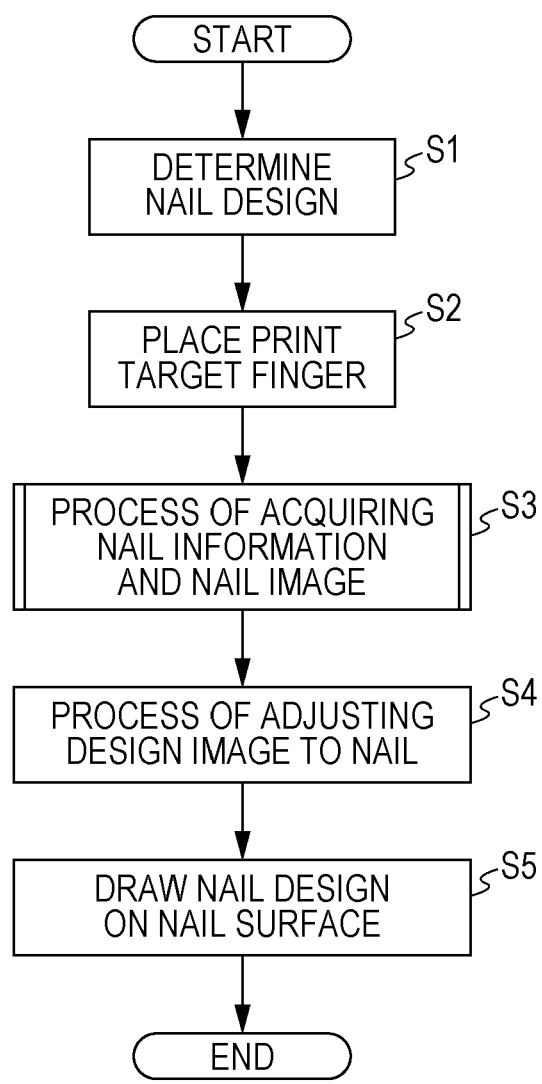
FIG. 7 is a flowchart illustrating a flow of a drawing process performed by the nail printing device according to the embodiment.

FIG. 7 is a flowchart illustrating a flow of the drawing process performed by the nail printing device 1.

Figure 8A:
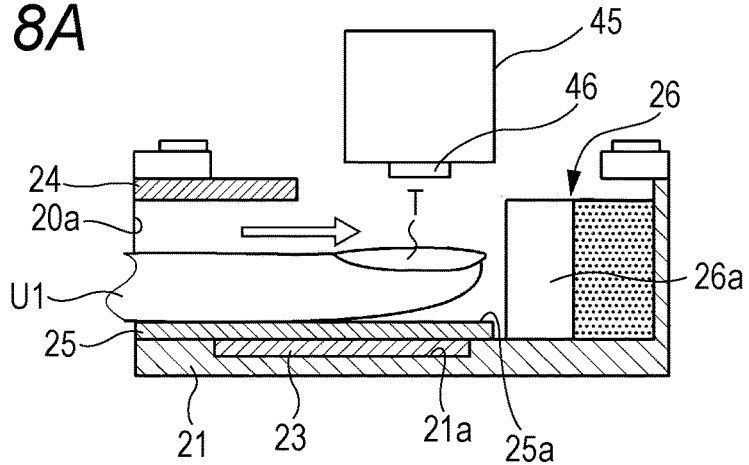
FIGS. 8A to 8C are explanatory views illustrating procedures for positioning a print target finger on a finger placement part according to the embodiment.
Figure 8B:
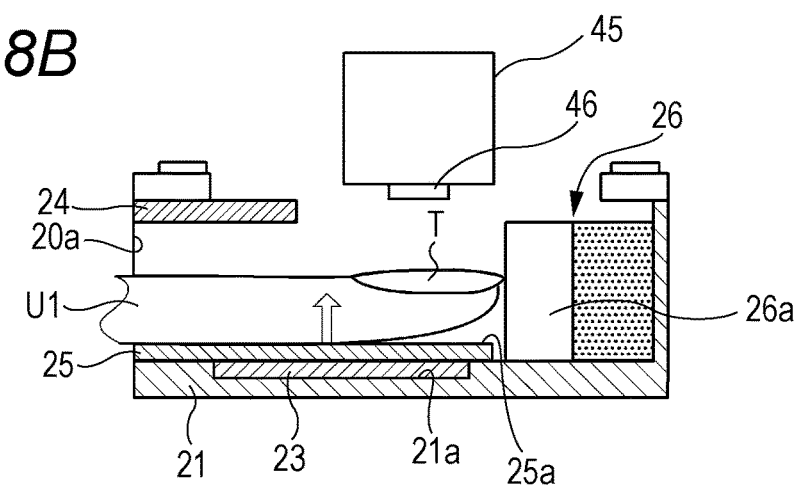
Figure 8C:
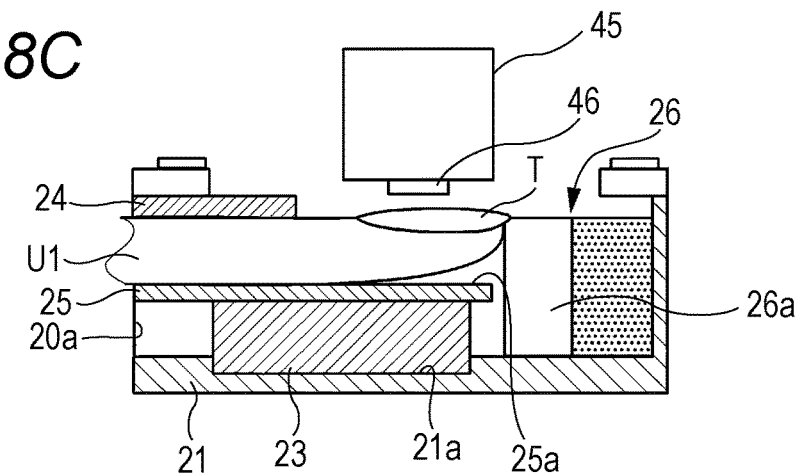

FIGS. 8A to 8C are explanatory views illustrating procedures for positioning a print target finger U1 on the finger placement part 25.

For performing drawing with the nail printing device 1, the user first turns on the power switch to activate the controller 50.

The display control unit 515 displays a design selection screen in which multiple nail designs are displayed on the display unit 13 to allow the user to select any one of the nail designs.

The user operates the selection button 121 or the like of the operation unit 12 to select a desired nail design from the nail designs displayed in the design selection screen. As a result, a selection signal is output from the operation unit 12 and one nail design is determined (step S1).

Subsequently, the user places a print target finger U1 in the nail printing device 1 (step S2).

Specifically, as illustrated in FIG. 8A, the user puts the print target finger U1 onto the finger placement part 25 of the print-target-finger insertion part 20a along the finger inserting direction (shown by an arrow in FIG. 8A).

The user then inserts the print target finger U1 deeper to such an extent that the nail T reaches the nail placement part 26 as illustrated in FIG. 8B. As a result, the print target finger U1 is positioned in the depth direction.

After the placement of the print target finger U1 onto the finger placement part 25 is completed, the lifting control unit 513 makes the lifting mechanism 23 operate to press the print target finger U1 upward together with the finger placement part 25.

As illustrated in FIG. 8C, the lifting mechanism 23 then stops when the print target finger U1 is lifted to a position where the upper face thereof comes into contact with the lower face of the finger pressing part 24.

As a result, the print target finger U1 is held between the finger placement part 25 and the finger pressing part 24 and positioned at a height suitable for drawing.

In this state, the user places the tip of the nail T onto the narrow portion 26a of the nail placement part 26. In this process, it is preferable to press the nail tip downward to a certain extent, so that the nail tip becomes more stable.

Note that the curvature of the nail T varies from individual to individual, and also varies in each individual depending on the print target finger U1. The difference in the curvature in the width direction of the nail T of the print target finger U1 is, however, absorbed by placement of the tip of the nail T on the narrow portion 26a.

Furthermore, the thickness of the print target finger U1 also varies from individual to individual, and also varies in each individual depending on the print target finger U1. The difference in the thickness of the print target finger U1 is, however, absorbed by pressing of the upper face of the print target finger U1 against the finger pressing part 24.

When the placement of the print target finger U1 is completed, the control unit 51 performs a process of acquiring nail information and a nail image (step S3).

When the width of the nail is to be obtained from the image data of a nail image acquired by the imaging unit 30, note that nail T is curved in the width direction. Thus, the edges of the nail T in the width direction are lower than the peak of the nail in the width direction. This makes the width of the nail in the nail image smaller than the actual value.

Hereinafter, description will be given in this respect in detail.

Figure 9:
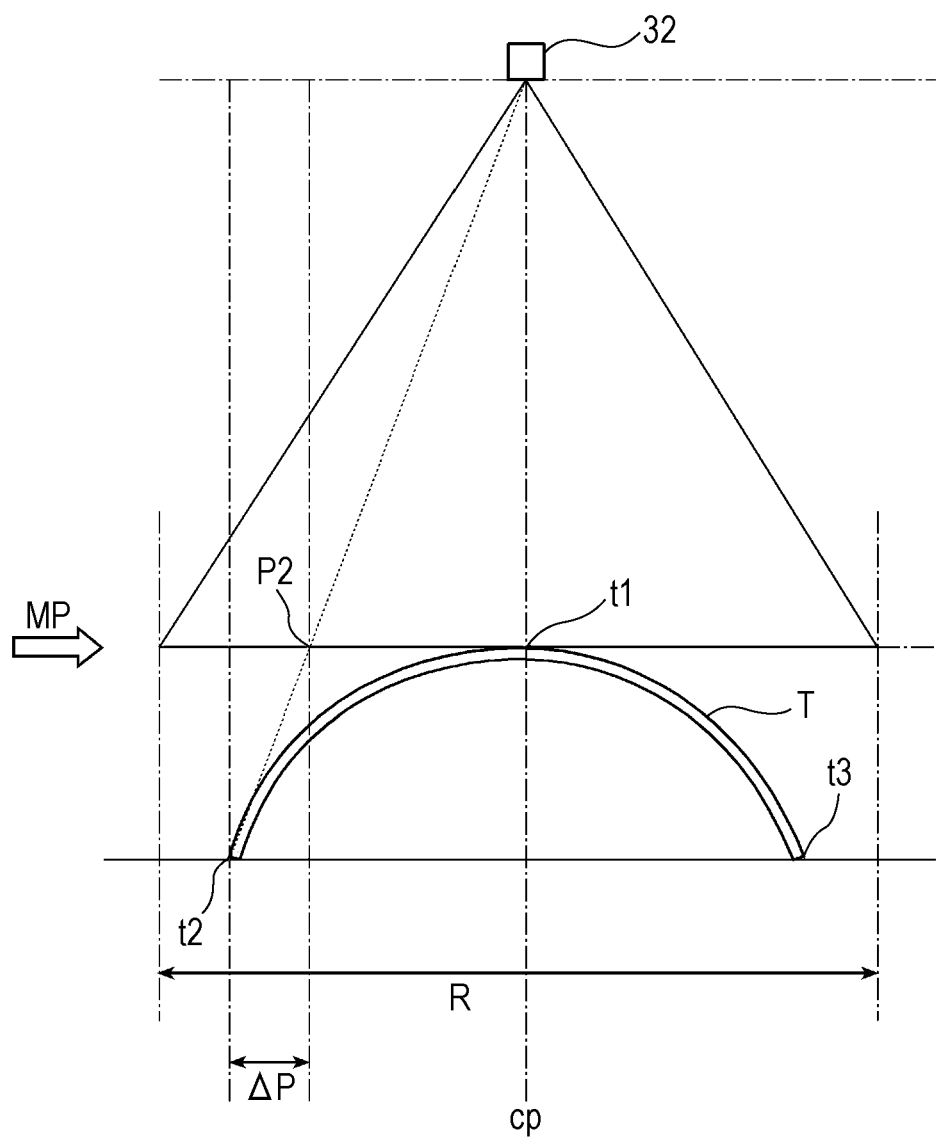
FIG. 9 is an explanatory diagram schematically illustrating the positions of a camera of an imaging unit and a nail according to the embodiment.

FIG. 9 is an explanatory diagram schematically illustrating the positions of the camera 32 of the imaging unit 30 and the nail T.

The camera 32 is positioned so that a reference point CP (a central point, for example) in the width direction of the imaging range R thereof overlaps with a peak t1 (a central point t, for example) in the width direction of the nail T.

Note that the nail T is contained in the imaging range R of the camera 32.

Nail edges t2 and t3 in the width direction of the nail T, however, are at positions away from the camera 32 (lower) than the peak t1 in the width direction of the nail T.

When the distance between the camera 32 and the peak t1 in the width direction of the nail T is a predetermined imaging distance H2 and a plane that is at the imaging distance H2 in the vertical direction from the camera 32 and that is parallel to the planar direction of the placement surface 25a is a measurement plane MP on which the camera 32 is focused and at which the actual dimension of an image is measured, the nail edge t2 in the width direction of the nail T appears at the position of a virtual edge (first edge) P2 on the measurement plane MP as illustrated in FIG. 9.

Specifically, in the nail image, the nail edge t2 in the width direction of the nail T is at a position (the virtual edge P2 in FIG. 9) inner than the actual position, and there is a difference ΔP between in the nail edge t2 and the virtual edge P2.

Note that the actual dimension of an image of an imaging target acquired by the camera 32 is measured on the basis of the angle of view of the camera 32 and the imaging distance H2 on the assumption that the imaging target is present on the measurement plane MP. Thus, the measured width of the nail T on the left of the peak t1 in FIG. 9 is a value smaller than the actual width by the difference ΔP. The measured width of the nail T on the right of the peak t1 in FIG. 9 is similarly a value smaller than the actual width.

In the embodiment of a process of acquiring nail information and a nail image according to the present invention described below, the width of the nail T can be correctly imaged when the nail edges t2 and t3 in the width direction of the nail T are at positions farther from the camera 32 than the peak t1 in the width direction of the nail T.

Figure 10:
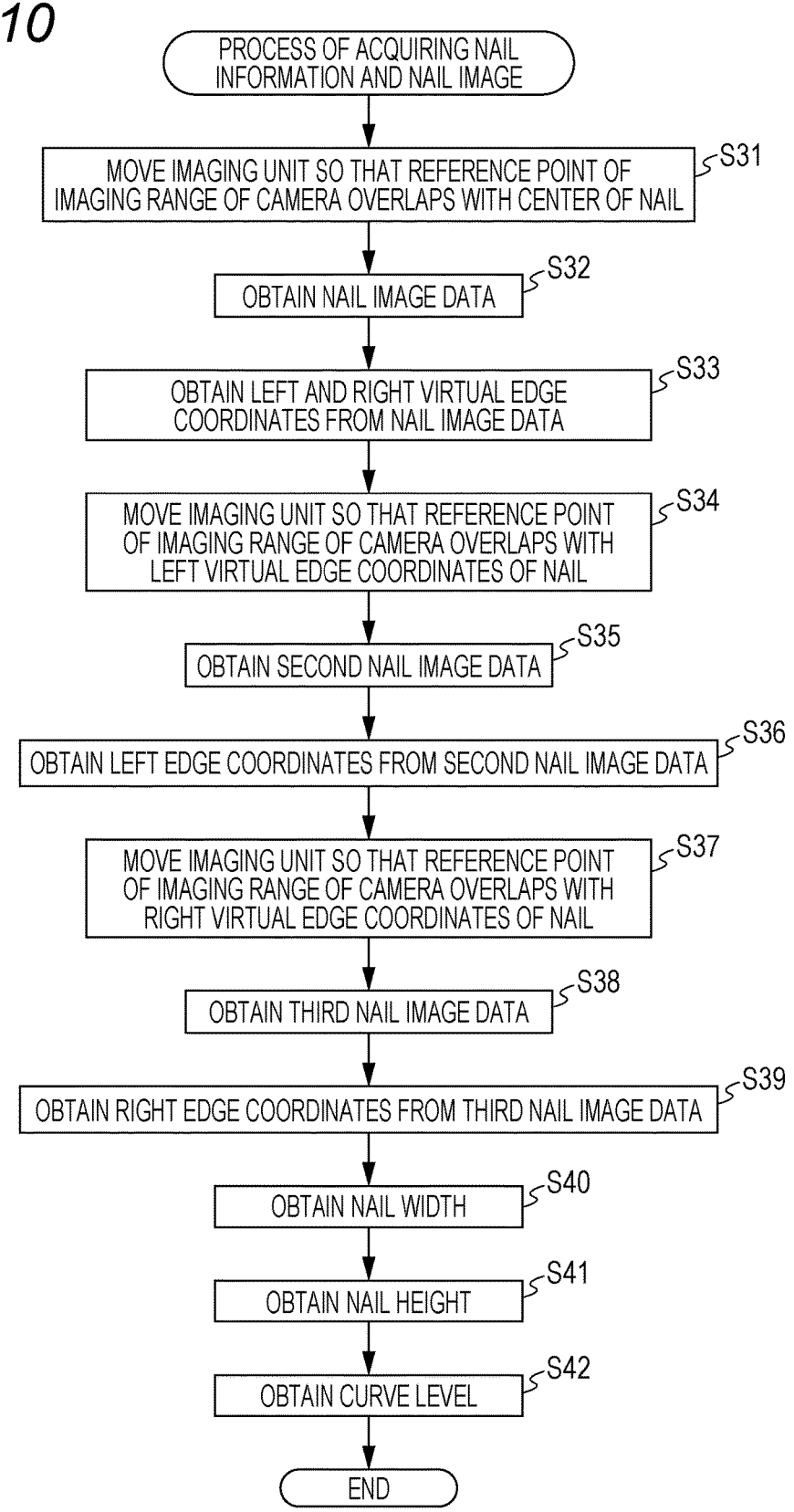
FIG. 10 is a flowchart illustrating a flow of a process of acquiring nail information and a nail image.

FIG. 10 is a flowchart illustrating a flow of the process of acquiring nail information and a nail image according to the embodiment.

Figure 11:
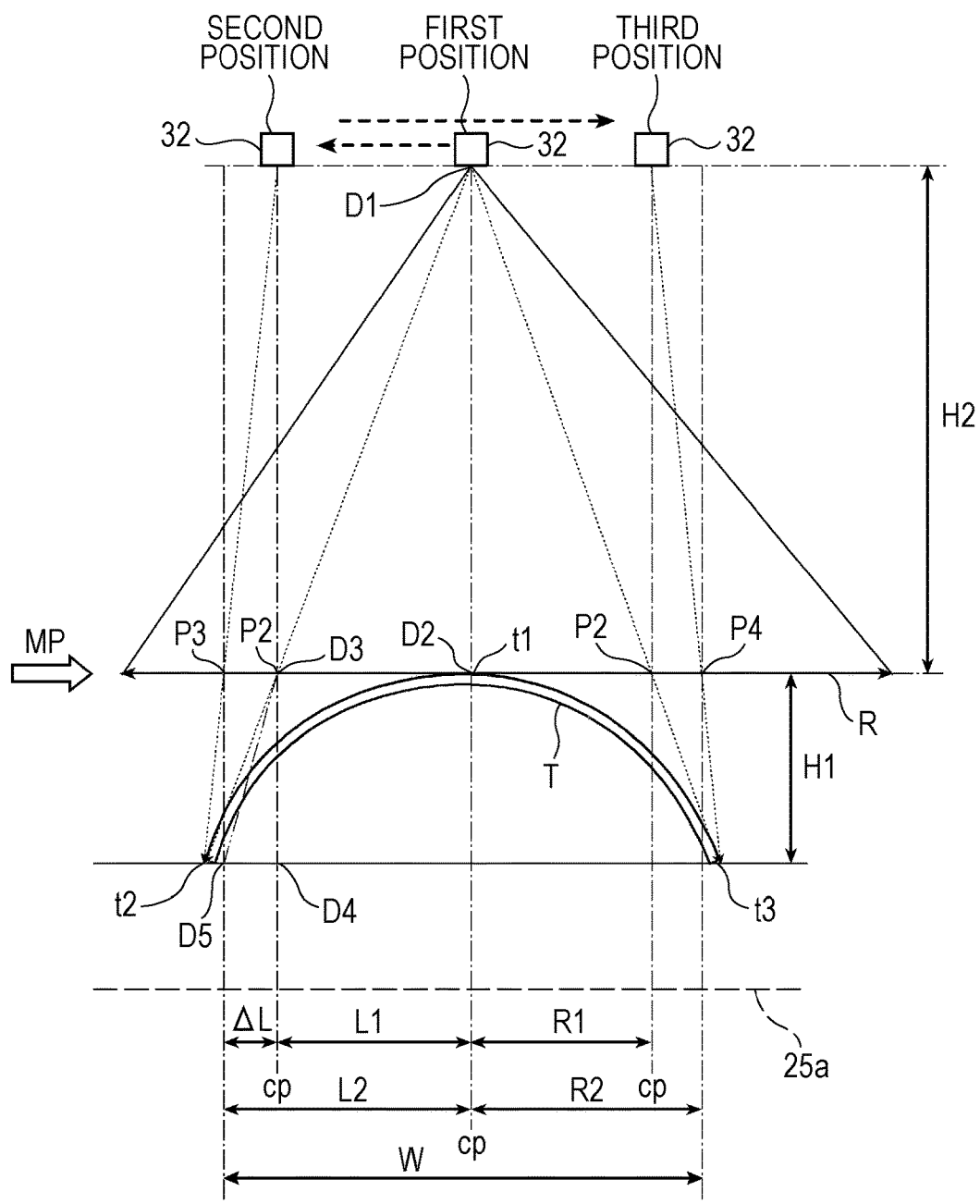
FIG. 11 is an explanatory diagram schematically illustrating the operation of the imaging unit during the process of acquiring nail information and a nail image in FIG. 10 for explaining the process.

FIG. 11 is an explanatory diagram schematically illustrating the operation of the imaging unit 30 during the process of acquiring nail information and a nail image for explaining the process.

Note that the process of acquiring nail information and a nail image corresponds to a nail information detection method according to the present invention.

First, the imaging control unit 511 controls the motor 43 that is a moving unit to move the imaging unit 30 so that the reference point CP of the imaging range R of the camera 32 overlaps with the peak t1 (the central point, for example) in the width direction of the nail T (step S31).

This positioning corresponds to a first positioning according to the present invention. The position of the camera 32 resulting from the positioning is a first position in FIG. 11.

This position corresponds to a reference of the coordinates.

Subsequently, the imaging control unit 511 controls the camera 32 at the first position to take an image (first image) of a nail that is an imaging target and acquire image data (step S32).

Thereafter, the nail information detection unit 512 detects a nail shape (the outline of the nail T) as the nail information from the acquired nail image (first image), and obtains coordinate positions (first edge positions) in the leftward and rightward direction of virtual edges P2 of the nail T on the basis of the outline of the nail T.

The nail information detection unit 512 then obtains the distances L1 and R1 from the first position to the left and right virtual edges P2 on the basis of coordinate positions in the leftward and rightward direction of the virtual edges P2 (step S33).

Subsequently, the imaging control unit 511 controls the motor 43 that is a moving unit to move the imaging unit 30 by the distance L1 so that the reference point CP of the imaging range R of the camera 32 overlaps with the coordinate position of the left virtual edge P2 (step S34).

This positioning corresponds to a second positioning according to the present invention, and the position of the camera 32 resulting from the positioning is a second position in FIG. 11.

Subsequently, the imaging control unit 511 controls the camera 32 at the second position to acquire a nail image (second image) (step S35).

Thereafter, the nail information detection unit 512 detects a nail shape (the outline of the nail T) as nail information from the acquired nail image (second nail image), and obtains coordinate position (second edge position) of an edge (second edge) P3 corresponding to the left edge of the nail T on the basis of the outline of the nail T. The nail information detection unit 512 then obtains a distance L2 from the first position to the left edge P3 on the basis of the coordinate position of the edge P3 in the leftward and rightward direction (step S36).

Subsequently, the imaging control unit 511 controls the motor 43 that is a moving unit to move the imaging unit 30 by the distance R1 so that the reference point CP of the imaging range R of the camera 32 overlaps with the coordinate position of the right virtual edge P2 (step S37).

This positioning corresponds to the second positioning according to the present invention, and the position of the camera 32 resulting from the positioning is a third position in FIG. 11.

Subsequently, the imaging control unit 511 controls the camera 32 at the third position to acquire a nail image (third image) (step S38).

Thereafter, the nail information detection unit 512 detects a nail shape (the outline of the nail T) as the nail information from the acquired nail image (third nail image), and obtains coordinate position (second edge position) of an edge (second edge) P4 corresponding to the right edge of the nail T on the basis of the outline of the nail T. The nail information detection unit 512 then obtains the distance R2 from the first position to the right edge P4 on the basis of the coordinate position in the leftward and rightward direction of the edge P4 (step S39).

Subsequently, the nail information detection unit 512 obtains the width of the nail T. Specifically, the nail information detection unit 512 adds up the distance L2 and the R2 to obtain the width W of the nail T (step S40). As illustrated in FIG. 11, the positions of the nail edges t2 and t3 in the width direction of the nail T and the obtained positions P3 and P4 are slightly different from one another. As a result, the width W obtained by adding up the distance L2 and the distance R2 is slightly smaller than the actual width (the distance between the nail edges t2 and t3) of the nail T. The difference between the width W and the actual width of the nail T is to such an extent that does not have a significant effect in drawing the nail T.

Subsequently, the nail information detection unit 512 obtains the height of the nail.

Note that a triangle formed by points D1, D2, and D3 and a triangle formed by points D3, D4, and D5 in FIG. 11 are substantially similar to each other.

Thus, the relation of the following expression (1) is satisfied on the basis of the height H1 (the length between D3 and D4) of the nail, the height H2 (the length between D1 and D2: imaging distance) from the peak of the nail T to the camera 32, the left virtual edge coordinates L1 (the length between D3 and D2), and the difference ΔL (the length between D4 and D5) between the left edge coordinates L2 and the virtual edge coordinates L1.

The nail information detection unit 512 obtains the height H1 of the nail according to the expression (1) (step S41).

Note that the distance (imaging distance) H2 between the peak of the nail T and the camera 32 is a known value preset according to a nail plane and the structure of the device 1.

$$H1 = L1 \cdot H2 / \Delta L \quad (1)$$

Subsequently, the nail information detection unit 512 obtains the curve level.

Specifically, the nail information detection unit 512 divides the height H1 of the nail by the width W of the nail to obtain the curve level according to which of multiple preset numerical ranges the obtained value BL is contained.

For example, when the value BL is equal to or larger than 0.3, the curve level is determined to be a level 3; when the value BL equal to or larger than 0.2 but smaller than 0.3, the curve level is determined to be a level 2; and when the value BL is smaller than 0.2, the curve level is determined to be a level 1 (step S42).

Subsequently, the control unit 51 performs a process of adjusting the image data of a nail design to the outline of the nail T detected by the nail information detection unit 512 (step S4).

As a result, drawing data with a drawing region within the outline of the nail T detected by the nail information detection unit 512 are generated.

In this process, the control unit 51 corrects the drawing data so that the drawing data match with the width W and the curve level of the nail T to generate drawing data adjusted to the actual outline of the nail T.

After the drawing data are generated, the drawing control unit 514 outputs the drawing data to the drawing heads 46, and performs drawing of a nail region according to the drawing data (that is, a region within the outline of the nail T detected by the nail information detection unit 512) (step S5).

After the drawing of the nail region is terminated, the drawing control unit 514 then terminates the drawing process on the nail T.

If there is a nail T of another finger to be painted, the print target finger U1 is switched and the above-described process is repeated.

As described above, according to the embodiment, the actual width W of the nail T can be detected substantially accurately by performing the first positioning of the imaging unit 30 so that the peak t1 in the width direction of the nail T overlaps with the reference point CP (the central position, for example) in the width direction of the imaging range of the imaging unit 30, detecting the edge coordinates in the width direction of the nail T by performing the second positioning of the imaging unit 30 so that the reference point CP is positioned about the edges in the width direction of the nail T after the first positioning, and imaging the nail T only from one direction.

Furthermore, the height H1 of the nail T can also be obtained.

In this manner, information on the shape of the nail T can be detected substantially accurately by imaging the nail T only from one direction.

Furthermore, the distances L2 and R2 of the nail T can be detected through a relatively small number of times of imaging and image processing, which can suppress the increase in the processing time period.

As described above, in the embodiment, there are slight differences between the actual positions of the nail edges t2 and t3 of the nail T and the positions of P3 and P4. This has no significant effect on drawing of the nail T without any change. For higher accuracy, however, a process of moving the imaging unit 30 so that the reference point CP overlaps with the left and right edges P3 and P4 and obtaining edge coordinates of the nail T from a nail image acquired at the position may be performed. As a result of repeating this process, the differences from the actual positions of the nail edges t2 and t3 of the nail T can be substantially eliminated.

Although an embodiment of the present invention has been described above, it should be appreciated that the present invention is not limited to the embodiment but can be modified in various manners without departing from the gist of the present invention.

For example, in the embodiment, a case in which the narrow portion 26a is provided on the side nearer to the user in the finger inserting direction of the nail placement part 26 is described as an example. The nail placement part 26, however, only needs to be a part on which at least the tip portion of the nail T can be put, and the shape thereof is not limited to that mentioned herein.

For example, the width of the narrow portion 26a may be wider or further smaller than that illustrated in the drawings.

For example, the nail placement part 26 may be formed only by a narrow portion 26a that is narrower than the dimension in the width direction of the nail T.

For example, the narrow portion 26a may not be provided. For example, the nail placement part 26 may be a rod-like member, or may have a structure in which a rod-like support member has a spherical or hemispherical portion on which the nail T is to be placed.

In any case, the height of the upper face of a portion of the nail placement part 26 on which the nail T is to be placed is preferably not higher than that of the upper face of the finger pressing part 24, and the height of the upper face of the portion of the nail placement part 26 on which the nail T is to be place is more preferably substantially equal to that of the lower face of the finger pressing part 24.

In the embodiment, the finger placement part 25 is disposed in the print-target-finger insertion part 20a, and the finger placement part 25 and the print target finger U1 placed thereon are lifted and lowered by the lifting mechanism 23. It is, however, not essential to provide the finger placement part 25 inside the print-target-finger insertion part 20a. When the finger placement part 25 is not provided, the print target finger U1 inserted in the print-target-finger insertion part 20a may be lifted and lowered directly by the lifting mechanism 23.

In the embodiment, an example of the nail printing device 1 in which one finger at a time is inserted into the device and drawing is sequentially performed has been described. The present invention, however, may also be applied to a device that can continuously perform drawing on multiple print target fingers U1.

In this case, the number of nail placement parts 26 that are provided is the number of the print target fingers U1 that are inserted.

In this case, the positions of the nail placement parts 26 may be shifted from one another according to the finger types in such a manner that a nail placement part 26 for the little finger is positioned on the side relatively nearer to the user in the finger inserting direction and a nail placement part 26 for the third finger is positioned on the side relatively farther from the user in the finger inserting direction depending on the lengths of the fingers, for example.

In the embodiment, an example in which the moving unit moves the imaging unit 30 has been described. Alternatively, an imaging target (finger) may be moved. In any case, the moving unit may be any unit that moves the imaging unit 30 relative to the imaging target.

In the "process of acquiring nail information and a nail image," a process other than that described above may be employed. Hereinafter, description will be given on modified examples thereof in detail.

[Modified Example 1]

Figure 12:
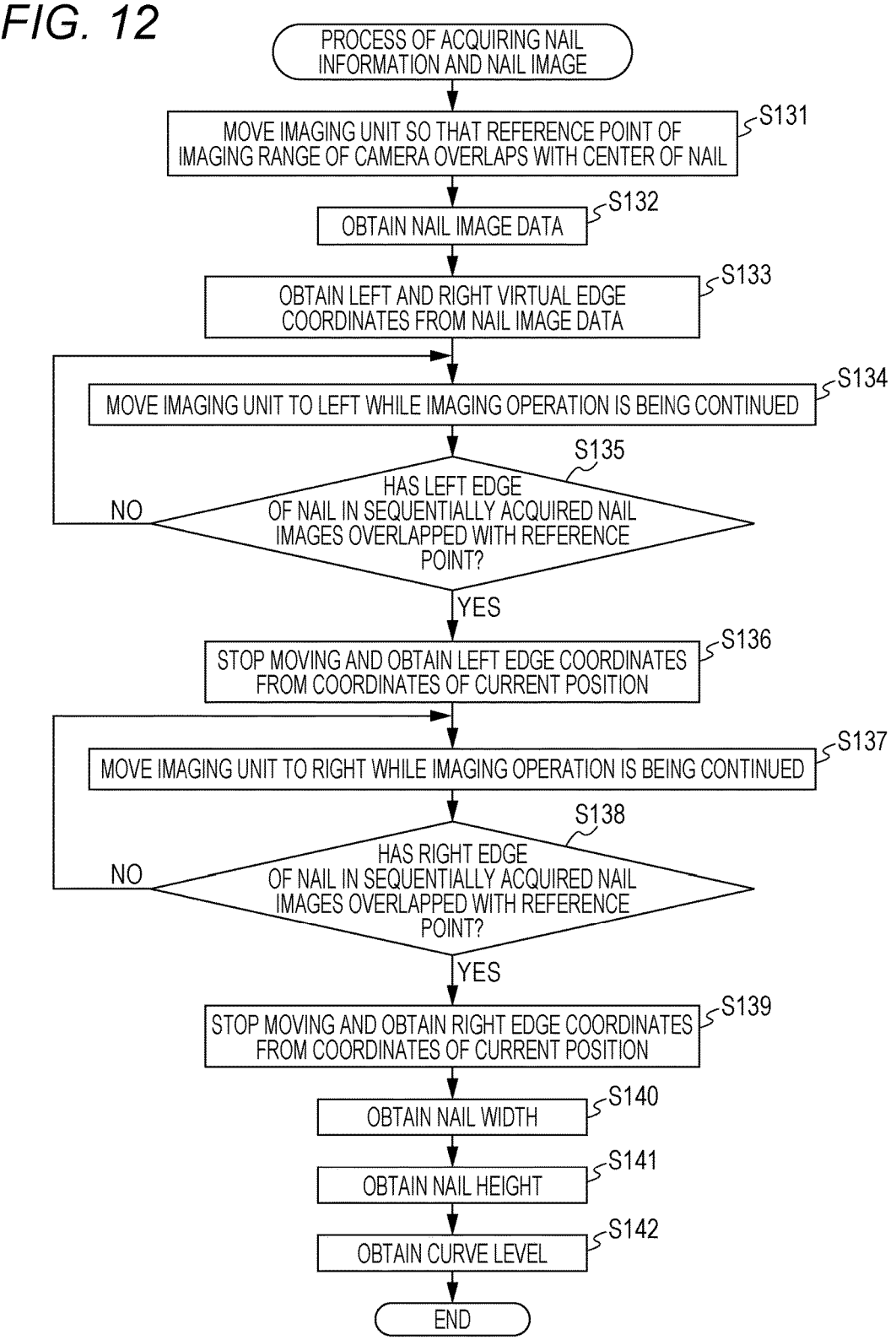
FIG. 12 is a flowchart illustrating a flow of a process for acquiring nail information and a nail image according to Modified Example 1.

FIG. 12 is a flowchart illustrating a flow of a process for acquiring nail information and a nail image according to Modified Example 1.

Figure 13:
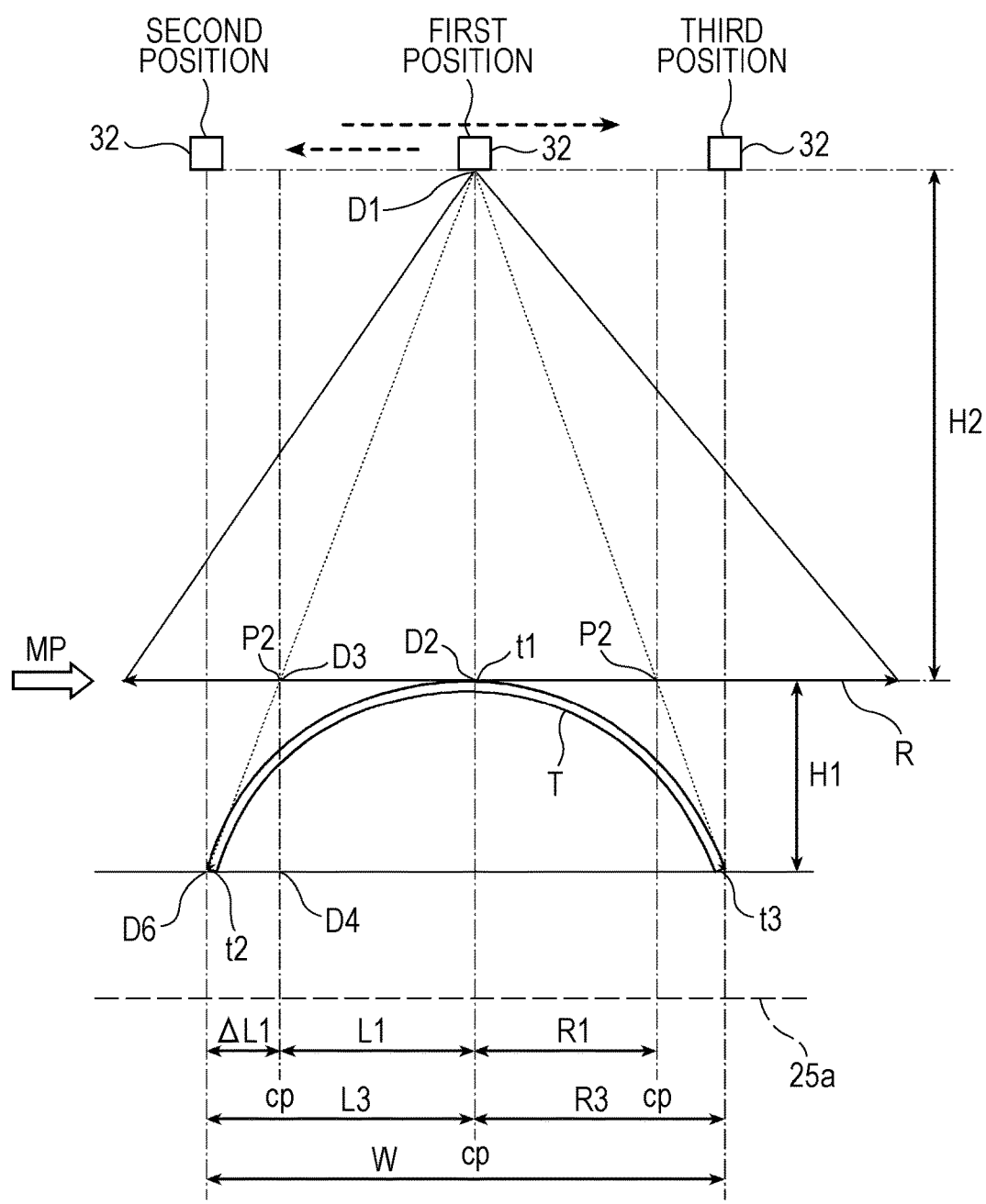
FIG. 13 is an explanatory diagram schematically illustrating the operation of the imaging unit 30 during the process of acquiring nail information and a nail image in FIG. 12 for explaining the process.

FIG. 13 is an explanatory diagram schematically illustrating the operation of the imaging unit 30 during the process of acquiring nail information and a nail image for explaining the process.

First, the imaging control unit 511 controls the motor 43 that is a moving unit to move the imaging unit 30 so that the reference point CP of the imaging range R of the camera 32 overlaps with the peak t1 of the nail T (step S131).

This positioning corresponds to a first positioning according to the present invention, and the position of the camera 32 resulting from the positioning is a first position in FIG. 13. This position corresponds to a reference of the coordinates.

Subsequently, the imaging control unit 511 controls the camera 32 at the first position to acquire an image (first image) of a nail that is an imaging target (step S132).

Thereafter, the nail information detection unit 512 detects a nail shape (the outline of the nail T) as nail information from the acquired nail image (first image), obtains coordinate positions (first edge positions) in the leftward and rightward direction of virtual edges (first edges) P2 of the nail T on a measurement plane MP on the basis of the outline of the nail T, and obtains the distances L1 and R1 from the first position to the left and right virtual edges P2 on the basis of the coordinate positions of the virtual edges P2 in the leftward and rightward direction (step S133).

Subsequently, the imaging control unit 511 controls the motor 43 that is a moving unit to move the imaging unit 30 to the left (step S134).

In this process, the imaging control unit 511 moves the imaging unit 30 while continuing (repeating) imaging operation with the camera 32.

The imaging control unit 511 then performs image processing on a nail image (second image) acquired by imaging at each predetermined timing and recognizes the left edge of the nail in the nail image.

The imaging control unit 511 then determines whether or not the left edge of the nail in the nail images (second images) acquired sequentially has overlapped with the reference point CP of the imaging range R of the camera 32, and moves to step S134 and continues (repeats) movement of the imaging unit 30 until the left edge overlaps with the reference point CP (step S135).

When the left edge of the nail in the nail images acquired sequentially has overlapped with the reference point CP of the imaging range R of the camera 32, the imaging control unit 511 proceeds to step S136.

Subsequently, the imaging control unit 511 stops movement of the imaging unit 30, and the nail information detection unit 512 obtains the distance L3 from the first position to the nail edge (second edge) t2 corresponding to the left edge of the nail T on the basis of the coordinates of the current position of the imaging unit 30 (step S136).

This positioning corresponds to a second positioning according to the present invention, and the position of the camera 32 resulting from the positioning is a second position in FIG. 13.

Subsequently, the imaging control unit 511 controls the motor 43 that is a moving unit to move the imaging unit 30 to the right (step S137).

In this process, the imaging control unit 511 moves the imaging unit 30 while continuing (repeating) imaging operation with the camera 32.

The imaging control unit 511 then performs image processing on a nail image (second image) acquired by imaging at each predetermined timing and recognizes the left edge of the nail in the nail image.

The imaging control unit 511 then determines whether or not the right edge of the nail in the nail images acquired sequentially has overlapped with the reference point CP of the imaging range R of the camera 32, and moves to step S137 and continues (repeats) movement of the imaging unit 30 until the right edge overlaps with the reference point CP (step S138).

When the right edge of the nail in the nail images acquired sequentially has overlapped with the reference point CP of the imaging range R of the camera 32, the imaging control unit 511 proceeds to step S139.

Subsequently, the imaging control unit 511 stops movement of the imaging unit 30, and the nail information detection unit 512 obtains the distance R3 from the first position to the nail edge (second edge) t3 corresponding to the right edge of the nail T on the basis of the coordinates of the current position (second edge position) of the imaging unit 30 (step S139).

This positioning corresponds to a second positioning according to the present invention, and the position of the camera 32 resulting from the positioning is a third position in FIG. 13.

Subsequently, the nail information detection unit 512 obtains the width of the nail T.

Specifically, the nail information detection unit 512 adds up the edge coordinates L3 and R3 to obtain the width W of the nail T (step S140).

Subsequently, the nail information detection unit 512 obtains the height of the nail.

Note that a triangle formed by points D1, D2, and D3 and a triangle formed by points D3, D4, and D6 in FIG. 13 are substantially similar to each other.

Thus, the relation of the following expression (2) is satisfied on the basis of the height H1 (the length between D3 and D4) of the nail, the height H2 (the length between D1 and D2) from the peak of the nail T to the camera 32, the left virtual edge coordinates L1 (the length between D3 and D2), and the difference ΔL1 (the length between D4 and D6) between the left edge coordinates L3 and the virtual edge coordinates L1.

The nail information detection unit 512 obtains the height H1 of the nail according to the expression (2) (step S141).

Note that the height H2 from the peak of the nail T to the camera 32 is a known value preset according to the structure of the nail printing device 1.

$$H1 = L1 \cdot H2 / \Delta L \qquad (2)$$

Subsequently, the nail information detection unit 512 obtains the curve level.

Specifically, the nail information detection unit 512 divides the height H1 of the nail by the width W of the nail to obtain the curve level according to which of multiple preset numerical ranges the obtained value BL is contained (step S142).

As described above, according to Modified Example 1, since the imaging unit 30 is positioned so that the reference point CP is positioned at the nail edges t2 and t3 of the nail T in the nail images acquired sequentially while imaging operation by the imaging unit 30 is continued, the distances L3 and R3 from the center of the nail T in the width direction to the nail edges t2 and t3 can be obtained accurately from the amounts of the movement.

[Modified Example 2]

Figure 14:
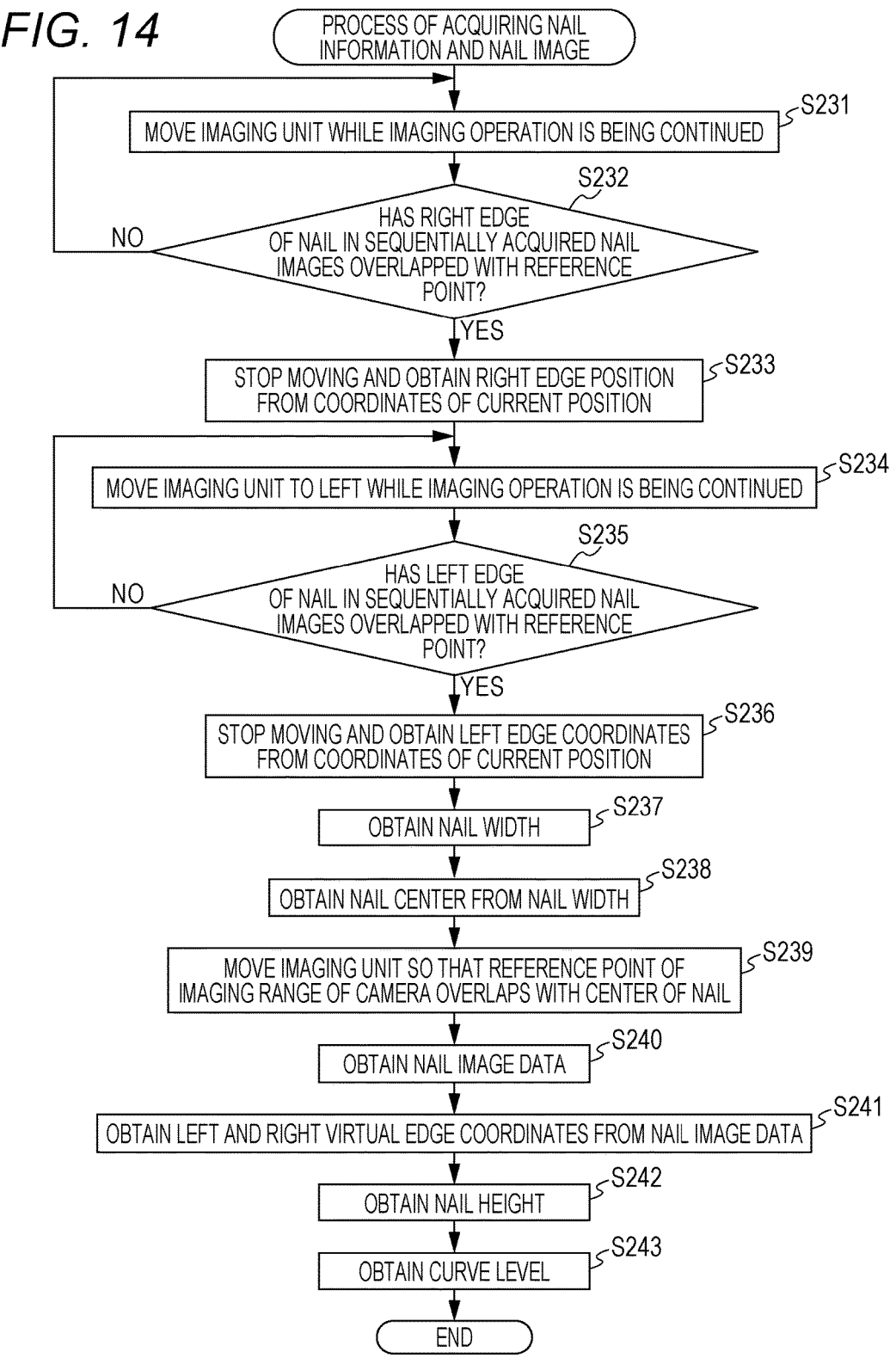
FIG. 14 is a flowchart illustrating a flow of a process for acquiring nail information and a nail image according to Modified Example 2.

FIG. 14 is a flowchart illustrating a flow of a process for acquiring nail information and a nail image according to Modified Example 2.

Figure 15:
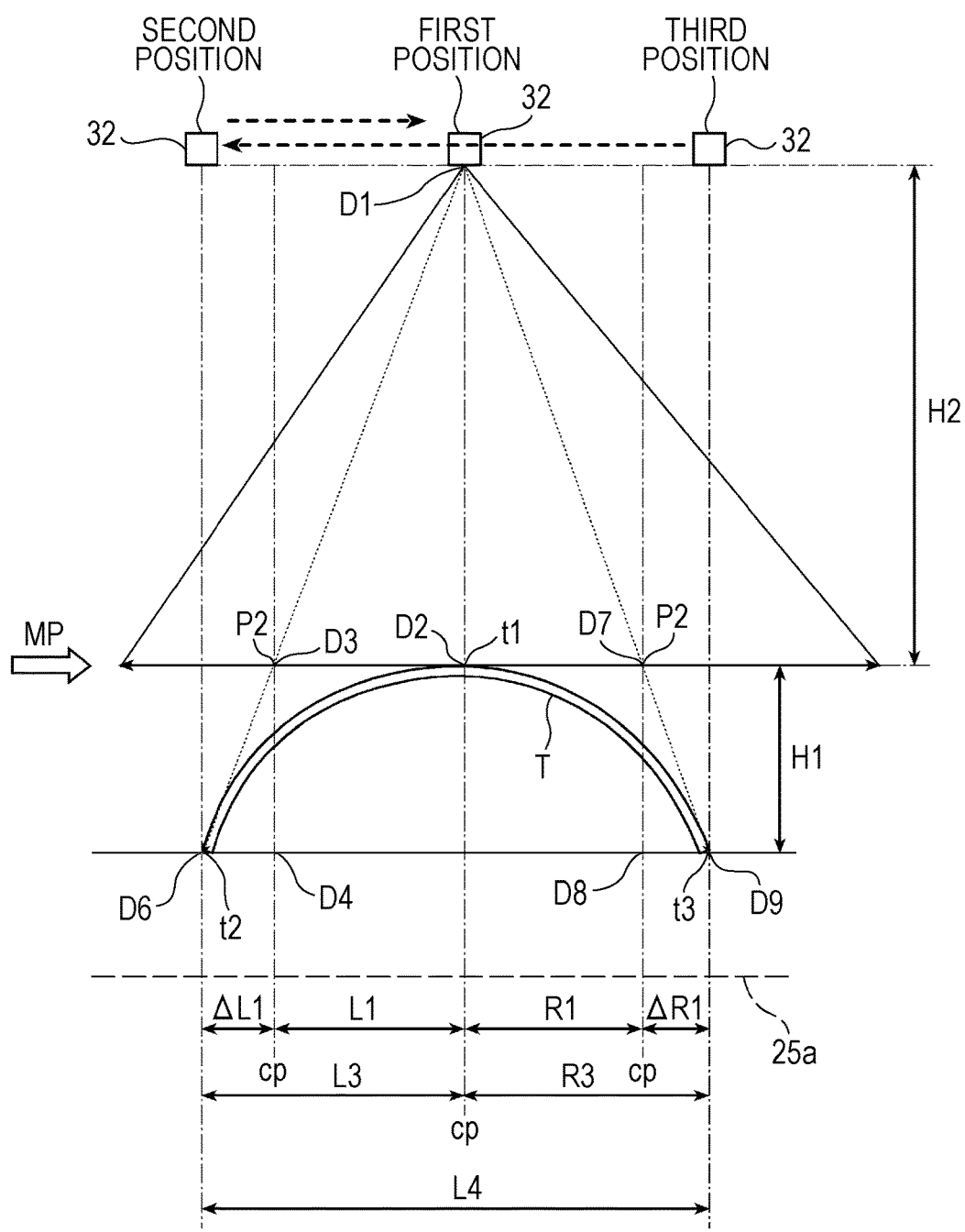
FIG. 15 is an explanatory diagram schematically illustrating the operation of the imaging unit 30 during the process of acquiring nail information and a nail image in FIG. 14 for explaining the process.

FIG. 15 is an explanatory diagram schematically illustrating the operation of the imaging unit 30 during the process of acquiring nail information and a nail image for explaining the process.

First, the imaging control unit 511 controls the motor 43 that is a moving unit to move the imaging unit 30 in such a manner as to scan the entire movable range (step S231).

In this process, the imaging control unit 511 moves the imaging unit 30 while continuing imaging operation with the camera 32.

The imaging control unit 511 then performs image processing on a nail image (second image) acquired by imaging at each predetermined timing and recognizes the right edge of the nail in the nail image.

The imaging control unit 511 then determines whether or not the right edge of the nail is present in the nail images acquired sequentially and whether or not the right edge has overlapped with the reference point CP of the imaging range R of the camera 32, and moves to step S231 and continues movement of the imaging unit 30 until the right edge overlaps with the reference point CP (step S232).

When the right edge of the nail in the nail images acquired sequentially has overlapped with the reference point CP of the imaging range R of the camera 32, the imaging control unit 511 proceeds to step S233.

Subsequently, the imaging control unit 511 stops movement of the imaging unit 30, and the nail information detection unit 512 obtains the edge position of the right nail edge t3 of the nail T on the basis of the coordinates of the current position (second edge position) of the imaging unit 30 (step S233).

This positioning corresponds to a second positioning according to the present invention, and the position of the camera 32 resulting from the positioning is a third position in FIG. 15. This third position is assumed to be a current provisional reference of the coordinates.

Subsequently, the imaging control unit 511 controls the motor 43 that is a moving unit to move the imaging unit 30 to the left (step S234).

In this process, the imaging control unit 511 moves the imaging unit 30 while continuing imaging operation with the camera 32.

The imaging control unit 511 then performs image processing on a nail image acquired by imaging at each predetermined timing and recognizes the left edge of the nail in the nail image.

The imaging control unit 511 then determines whether or not the left edge of the nail in the nail images acquired sequentially has overlapped with the reference point CP of the imaging range R of the camera 32, and moves to step S234 and continues movement of the imaging unit 30 until the left edge overlaps with the reference point CP (step S235).

When the left edge of the nail in the nail images acquired sequentially has overlapped with the reference point CP of the imaging range R of the camera 32, the imaging control unit 511 proceeds to step S236.

Subsequently, the imaging control unit 511 stops movement of the imaging unit 30, and the nail information detection unit 512 obtains the edge position of the nail edge (second edge) t2 corresponding to the left edge of the nail T on the basis of the coordinates of the current position (second edge position) of the imaging unit 30 (step S236).

This positioning corresponds to a second positioning according to the present invention, and the position of the camera 32 resulting from the positioning is a second position in FIG. 15.

Subsequently, the nail information detection unit 512 obtains the width of the nail T. Specifically, the nail information detection unit 512 sets a distance L4 between the edge position of a nail edge (second edge) t3 corresponding to the right edge of the nail T and the edge position of the left nail edge t2 to be the width W of the nail T (step S237).

Subsequently, the nail information detection unit 512 sets a point at half of the width of the nail T to be the peak t1 of the nail, and further resets this point to be the reference of coordinates (step S238).

With the resetting of the reference of coordinates, edge coordinates L3 and R3 of the left and right nail edges t2 and t3 of the nail T are also obtained.

Subsequently, the imaging control unit 511 controls the motor 43 that is a moving unit to move the imaging unit 30 so that the reference point CP of the imaging range R of the camera 32 overlaps with the peak t1 of the nail T (step S239).

This positioning corresponds to a first positioning according to the present invention, and the position of the camera 32 resulting from the positioning is a first position in FIG. 15.

Subsequently, the imaging control unit 511 controls the camera 32 at the first position to acquire an image (first image) of a nail that is an imaging target (step S240).

Thereafter, the nail information detection unit 512 detects a nail shape (the outline of the nail T) as nail information from the acquired nail image, obtains left and right virtual edges (first edges) P2 of the nail T on a measurement plane MP on the basis of the outline of the nail T, and obtains the distances L1 and R1 from the first position to the virtual edges P2 on the basis of the coordinate positions (first edge position) of the virtual edges P2 in the leftward and rightward direction (step S241).

Subsequently, the nail information detection unit 512 obtains the height of the nail.

Note that a triangle formed by points D1, D2, and D3 and a triangle formed by points D3, D4, and D6 in FIG. 15 are substantially similar to each other, the expression (2) described above is satisfied, and the nail information detection unit 512 obtains the height H1 of the nail according to the expression (2) (step S242).

Subsequently, the nail information detection unit 512 obtains the curve level.

Specifically, the nail information detection unit 512 divides the height H1 of the nail by the width W of the nail to obtain the curve level according to which of multiple preset numerical ranges the obtained value BL is contained (step S243).

As described above, according to Modified Example 2, since the imaging unit 30 is positioned so that the reference point CP is positioned at the nail edges t2 and t3 of the nail T in the nail images acquired sequentially while imaging operation by the imaging unit 30 is continued, the distances L3 and R3 from the center of the nail T in the width direction to the nail edges t2 and t3 can be obtained accurately from the amounts of the movement.

Since the center t1 of the nail is obtained thereafter, the center t1 of the nail can also be accurately detected, which can improve the accuracy of the first positioning.

Note that, in the embodiment described above, the curve level is obtained by using only parameters of the left side of the nail T. This is for a case in which the nail T has a generally symmetric shape in cross section in the width direction and in which the nail edges t2 and t3 in the width direction of the nail T are the same in the position in the height direction of the nail T.

In contrast, there are cases in which the left half and the right half of the nail T differ in cross-sectional shape in the width direction from each other and in which the positions of the nail edges t2 and t3 in the width direction of the nail T differ from each other in the position in the height direction of the nail T. Thus, in order to address such cases, the curve level of the left half may be calculated with left side parameters of the nail T and the curve level of the right half may be calculated with right side parameters thereof.

Since the curve level of the left half can be obtained by the method described above, a method for calculating the curve level of the right half will be hereinafter described in detail.

A triangle formed by points D1, D2, and D7 and a triangle formed by points D7, D8, and D9 in FIG. 15 are substantially similar to each other. Thus, the relation of the following expression (3) is satisfied on the basis of the height H1 (the length between D7 and D8) of the nail, the height H2 (the length between D1 and D2) from the peak of the nail T to the camera 32, the right virtual edge coordinates R1 (the length between D2 and D7), and the difference ΔR1 (the length between D8 and D9) between the right edge coordinates R3 and the virtual edge coordinates R1, and the nail information detection unit 512 obtains the height H1 of the nail on the basis of the expression (3).

$$H1 = R1 \cdot H2 / \Delta R \quad (3)$$

The nail information detection unit 512 then divides the height H1 of the nail obtained from the expression (3) by the width W of the nail, and obtains the curve level of the right half according to which of numerical ranges the obtained value BL is contained.

While some embodiments of the present invention have been described above, the scope of the present invention is not limited to the embodiments described above but includes the scope of the invention defined in the claims and the scope of equivalents thereof.

What is claimed is:

1. A nail information detection device comprising:
a placement surface on which a finger or a toe having a nail is placeable, the nail having a nail edge at one end in a width direction of the nail;
an imaging unit which images the nail from one direction and acquires image data of an image of the nail;
a moving unit which moves the imaging unit relative to the nail while keeping an imaging distance in the one direction constant, the imaging distance being a distance between the imaging unit and a measurement plane, the measurement plane being in contact with a peak position of the nail in the width direction and being parallel to a planar direction of the placement surface; and
a control unit which controls the moving unit and the imaging unit to detect nail information including a first position and a second position corresponding to positions of the nail in the image of the nail, and a height of the nail,
wherein the control unit performs:
a first edge detection process in which the moving unit positions the imaging unit to a third position so that a reference point of an imaging range of the imaging unit in the width direction is aligned at the peak position along the one direction, and the control unit detects a position at which a virtual line directed from the imaging unit to the nail edge intersects with the measurement plane in the image of the nail as the first position based on the image data acquired by the imaging unit being at the third position; and
a second edge detection process of performing one of (1) a first process in which the moving unit positions the imaging unit to a fourth position so that the reference point is aligned at the first position along the one direction, and the control unit detects a position at which a virtual line directed from the imaging unit to the nail edge intersects with the measurement plane in the image of the nail as the second position based on the image data acquired by the imaging unit being at the fourth position, and (2) a second process in which the moving unit positions the imaging unit to a fifth position so that the reference point is aligned at a position of the nail edge along the one direction based on the image data acquired by the imaging unit, and the control unit detects the fifth position as the second position; and
wherein the control unit obtains a distance between the peak position of the nail and a position of the nail edge along the one direction as the height of the nail, based on a relation between a first triangle and a second triangle, the first triangle being formed by the peak position, the first position, and the position of the reference point when the imaging unit is at the third position, and the second triangle being formed by the first position, a sixth position which is along the one direction from the first position, and a seventh position which is along the one direction from the second position, the sixth and seventh positions being positions on a plane that is parallel to the measurement plane and in contact with the nail edge.

2. The nail information detection device according to claim 1, wherein the one direction is perpendicular to the planar direction of the placement surface, and the control unit detects the position of the nail edge on the measurement plane based on the image data, the imaging distance and an angle of view of the imaging unit in the first edge detection process and the second edge detection process.

3. The nail information detection device according to claim 1, wherein the reference point is a center point in the width direction of the imaging range of the imaging unit.

4. The nail information detection device according to claim 1, wherein the control unit performs the second edge detection process after performing the first edge detection process, and wherein in the second edge detection process, the control unit performs the first process.

5. The nail information detection device according to claim 1, wherein:
the control unit performs the second edge detection process after performing the first edge detection process,
in the second edge detection process, the control unit performs the second process, and
in the second process, the control unit moves the imaging unit relative to the nail along the width direction of the nail by the moving unit while continuing imaging operation of the imaging unit and positions the imaging unit to the fifth position based on the image data acquired sequentially by the imaging unit.

6. The nail information detection device according to claim 1, wherein when the peak position of the nail is at a central position in the width direction of the nail:
the control unit performs the first edge detection process after performing the second edge detection process,
in the second edge detection process, the control unit performs the second process, and
in the second process, the control unit moves the imaging unit relative to the nail along the width direction of the nail by the moving unit while continuing imaging operation of the imaging unit and positions the imaging unit to the fifth position based on the image data acquired sequentially by the imaging unit.

7. The nail information detection device according to claim 1, wherein the first triangle and the second triangle are right triangles and are substantially similar to each other in shape.

8. A drawing apparatus comprising:
a placement surface on which a finger or a toe having a nail is placeable, the nail having a nail edge at one end in a width direction of the nail;
an imaging unit which images the nail from one direction and acquires image data of an image of the nail;
a moving unit which moves the imaging unit relative to the nail while keeping an imaging distance in the one direction constant, the imaging distance being a distance between the imaging unit and a measurement plane, the measurement plane being in contact with a peak position of the nail in the width direction and being parallel to a planar direction of the placement surface;
a control unit which controls the moving unit and the imaging unit to detect nail information including a first position and a second position corresponding to positions of the nail in the image of the nail, and a height of the nail, and which generates drawing data obtained by correcting data of a set design image based on the detected nail information; and
a drawing unit which draws the nail according to the drawing data,
wherein the control unit performs:
a first edge detection process in which the moving unit positions the imaging unit to a third position so that a reference point of an imaging range of the imaging unit in the width direction is aligned at the peak position along the one direction, and the control unit detects a position at which a virtual line directed from the imaging unit to the nail edge intersects with the measurement plane in the image of the nail as the first position based on the image data acquired by the imaging unit being at the third position; and
a second edge detection process of performing one of (1) a first process in which the moving unit positions the imaging unit to a fourth position so that the reference point is aligned at the first position along the one direction, and the control unit detects a position at which a virtual line directed from the imaging unit to the nail edge intersects with the measurement plane in the image of the nail as the second position based on the image data acquired by the imaging unit being at the fourth position, and (2) a second process in which the moving unit positions the imaging unit to a fifth position so that the reference point is aligned at a position of the nail edge along the one direction based on the image data acquired by the imaging unit, and the control unit detects the fifth position as the second position; and
wherein the control unit obtains a distance between the peak position of the nail and a position of the nail edge along the one direction as the height of the nail, based on a relation between a first triangle and a second triangle, the first triangle being formed by the peak position, the first position, and the position of the reference point when the imaging unit is at the third position, and the second triangle being formed by the first position, a sixth position which is along the one direction from the first position, and a seventh position which is along the one direction from the second position, the sixth and seventh positions being positions on a plane that is parallel to the measurement plane and in contact with the nail edge.

9. The drawing apparatus according to claim 8, wherein the reference point is a center point in the width direction of the imaging range of the imaging unit.

10. The drawing apparatus according to claim 8, wherein the control unit performs the second edge detection process after performing the first edge detection process, and wherein in the second edge detection process, the control unit performs the first process.

11. The drawing apparatus according to claim 8, wherein:
the control unit performs the second edge detection process after performing the first edge detection process,
in the second edge detection process, the control unit performs the second process, and
in the second process, the control unit moves the imaging unit relative to the nail along the width direction of the nail by the moving unit while continuing imaging operation of the imaging unit and positions the imaging unit to the fifth position based on the image data acquired sequentially by the imaging unit.

12. The drawing apparatus according to claim 8, wherein when the peak position of the nail is at a central position in the width direction of the nail:
the control unit performs the first edge detection process after performing the second edge detection process, in the second edge detection process, the control unit performs the second process, and in the second process, the control unit moves the imaging unit relative to the nail along the width direction of the nail by the moving unit while continuing imaging operation of the imaging unit and positions the imaging unit to the fifth position based on the image data acquired sequentially by the imaging unit.

13. The nail information detection device according to claim 8, wherein the first triangle and the second triangle are right triangles and are substantially similar to each other in shape.

14. A nail information detection method comprising:

an imaging step of imaging a nail of a finger or a toe placed on a placement surface, the nail having a nail edge at one end in a width direction of the nail, by an imaging unit from one direction and acquiring image data of an image of the nail;

a moving step of moving the imaging unit relative to the nail while keeping an imaging distance in the one direction constant, the imaging distance being a distance between the imaging unit and a measurement plane, the measurement plane being in contact with a peak position of the nail in the width direction and being parallel to a planar direction of the placement surface; and a nail information detecting step of controlling the imaging unit to detect nail information including a first position and a second position corresponding to positions of the nail in the image of the nail, and a height of the nail, wherein the nail information detecting step includes:

a first edge detecting step of positioning the imaging unit to a third position so that a reference point of an imaging range of the imaging unit in the width direction is aligned at the peak position along the one direction, and detecting a position at which a virtual line directed from the imaging unit to the nail edge intersects with the measurement plane in the image of the nail as the first position based on the image data acquired by the imaging unit being at the third position;

a second edge detecting step of performing one of: (1) a first processing step of positioning the imaging unit to a fourth position so that the reference point is aligned at the first position along the one direction, and detecting a position at which a virtual line directed from the imaging unit to the nail edge intersects with the measurement plane in the image of the nail as the second position based on the image data acquired by the imaging unit being at the fourth position, and (2) a second processing step of positioning the imaging unit to a fifth position so that the reference point is aligned at a position of the nail edge along the one direction based on the image data acquired by the imaging unit, and detecting the fifth position as the second position; and a height obtaining step of obtaining a distance between the peak position of the nail and a position of the nail edge along the one direction as the height of the nail, based on a relation between a first triangle and a second triangle, the first triangle being formed by the peak position, the first position, and the position of the reference point when the imaging unit is at the third position, and the second triangle being formed by the first position, a sixth position which is along the one direction from the first position, and a seventh position which is along the one direction from the second position, the sixth and seventh positions being positions on a plane that is parallel to the measurement plane and in contact with the nail edge.

15. The nail information detection method according to claim 14, wherein the second edge detecting step is performed after the first edge detecting step is performed, and wherein in the second edge detecting step, the first processing step is performed.

16. The nail information detection method according to claim 14, wherein:

the second edge detecting step is performed after the first edge detecting step is performed, in the second edge detecting step, the second processing step is performed, and in the second processing step, the imaging unit is moved relative to the nail along the width direction of the nail while continuing imaging operation, so that the imaging unit is positioned to the fifth position based on the image data acquired sequentially by the imaging unit.

17. The nail information detection method according to claim 14, wherein when the peak position of the nail is a central position in the width direction of the nail:

the first edge detecting step is performed after the second edge detecting step is performed, in the second edge detecting step, the second processing step is performed, and in the second processing step, the imaging unit is moved relative to the nail along the width direction of the nail while continuing imaging operation, so that the imaging unit is positioned to the fifth position based on the image data acquired sequentially by the imaging unit.

18. The nail information detection device according to claim 14, wherein the first triangle and the second triangle are right triangles and are substantially similar to each other in shape.

* * * * *